US005774660A

United States Patent [19]
Brendel et al.

[11] Patent Number: 5,774,660
[45] Date of Patent: Jun. 30, 1998

[54] WORLD-WIDE-WEB SERVER WITH DELAYED RESOURCE-BINDING FOR RESOURCE-BASED LOAD BALANCING ON A DISTRIBUTED RESOURCE MULTI-NODE NETWORK

[75] Inventors: Juergen Brendel, Redwood City; Charles J. Kring, Sunnyvale; Zaide Liu, Santa Clara; Christopher C. Marino, Mountain View, all of Calif.

[73] Assignee: Resonate, Inc., Mountain View, Calif.

[21] Appl. No.: 691,006

[22] Filed: Aug. 5, 1996

[51] Int. Cl.⁶ .................. G06F 13/00; G06F 17/30
[52] U.S. Cl. ............... 395/200.31; 395/200.32; 395/200.33; 395/200.36; 395/200.49; 395/200.56; 395/200.59; 395/200.66; 395/200.69; 395/670; 395/674; 395/675
[58] Field of Search .............. 395/200.3–200.33, 395/200.36, 200.47–200.5, 200.54–200.6, 200.66, 200.69, 182.02, 182.08, 670–675

[56] References Cited

U.S. PATENT DOCUMENTS

| | | | |
|---|---|---|---|
| 5,307,347 | 4/1994 | Duault et al. | 370/439 |
| 5,341,499 | 8/1994 | Doragh | 395/681 |
| 5,343,477 | 8/1994 | Yamada | 395/182.02 |
| 5,355,453 | 10/1994 | Row et al. | 395/200.49 |
| 5,355,472 | 10/1994 | Lewis | 707/101 |
| 5,400,335 | 3/1995 | Yamada | 370/524 |
| 5,404,534 | 4/1995 | Foss et al. | 395/683 |
| 5,426,427 | 6/1995 | Chinnock et al. | 395/200.69 |
| 5,442,749 | 8/1995 | Northcutt et al. | 395/200.49 |
| 5,442,771 | 8/1995 | Filepp et al. | 395/200.49 |
| 5,452,447 | 9/1995 | Nelson et al. | 707/205 |
| 5,455,932 | 10/1995 | Major et al. | 211/152 |
| 5,455,948 | 10/1995 | Poole et al. | 707/102 |
| 5,495,426 | 2/1996 | Waclawsky et al. | 395/200.56 |
| 5,539,883 | 7/1996 | Allon et al. | 395/675 |
| 5,603,029 | 2/1997 | Aman et al. | 395/675 |
| 5,612,897 | 3/1997 | Rege | 395/200.49 |

OTHER PUBLICATIONS

Dias et al., "A Scalable and Highly Available Web Server", Digest of Papers, Compcon 1996, Technologies for the Information Superhighway, Forty–First IEEE Computer Society International Conference (Cat. No. 96CB35911), pp. 85–92, Feb. 1996.

Attanasio & Smith, "A Virtual Multiprocessor Implemented by an Encapsulated Cluster of Loosely Coupled Computers", IBM Research Report RC18442, Apr. 1992.

(List continued on next page.)

*Primary Examiner*—Parshotam S. Lall
*Assistant Examiner*—Bharat Barot
*Attorney, Agent, or Firm*—Stuart T. Auvinen

[57] ABSTRACT

A multi-node server transmits world-wide-web pages to network-based browser clients. A load balancer receives all requests from clients because they use a virtual address for the entire site. The load balancer makes a connection with the client and waits for the URL from the client. The URL specifies the requested resource. The load balancer waits to perform load balancing until after the location of the requested resource is known. The connection and URL request are passed from the load balancer to a second node having the requested resource. The load balancer re-plays the initial connection packet sequence to the second node, but modifies the address to that for the second node. The network software is modified to generate the physical network address of the second node, but then changes the destination address back to the virtual address. The second node transmits the requested resource directly to the client, with the virtual address as its source. Since all requests are first received by the load balancer which determines the physical location of the requested resource, nodes may contain different resources. The entire contents of the web site is not mirrored onto all nodes. Network bottlenecks are avoided since the nodes transmit the large files back to the client directly, bypassing the load balancer. Client browsers can cache the virtual address, even though different nodes with different physical addresses service requests.

16 Claims, 18 Drawing Sheets

OTHER PUBLICATIONS

Balancing Act: Web Server Load Balancers, PC Magazine, Dec. 17, 1996, p. 42.

BIG/ip Product Spec, FAQ from Website www.f5.com, F5 Labs, 1996.

"How Your Browser Finds the Page You Want" PC Magazine Mar. 12, 1996 p. 107.

"Internet Server Market Draws Foes" San Jose Business Journal, Mar. 25, 1996, p. 8.

HydraWEB Frequently Asked Questions, Apr. 23, 1996, pp. 1–8.

HydraWEB Load–Balancer Product Literature, 1996.

Cisco Local Director WWW pp. 1–5, 1996.

WomPlex WWW pp. 1–3, 1996.

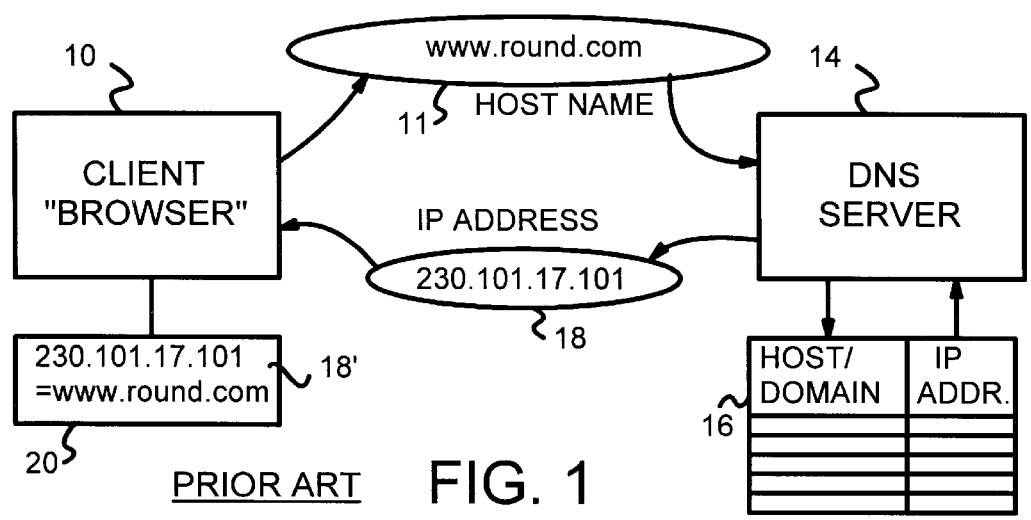
PRIOR ART  FIG. 1
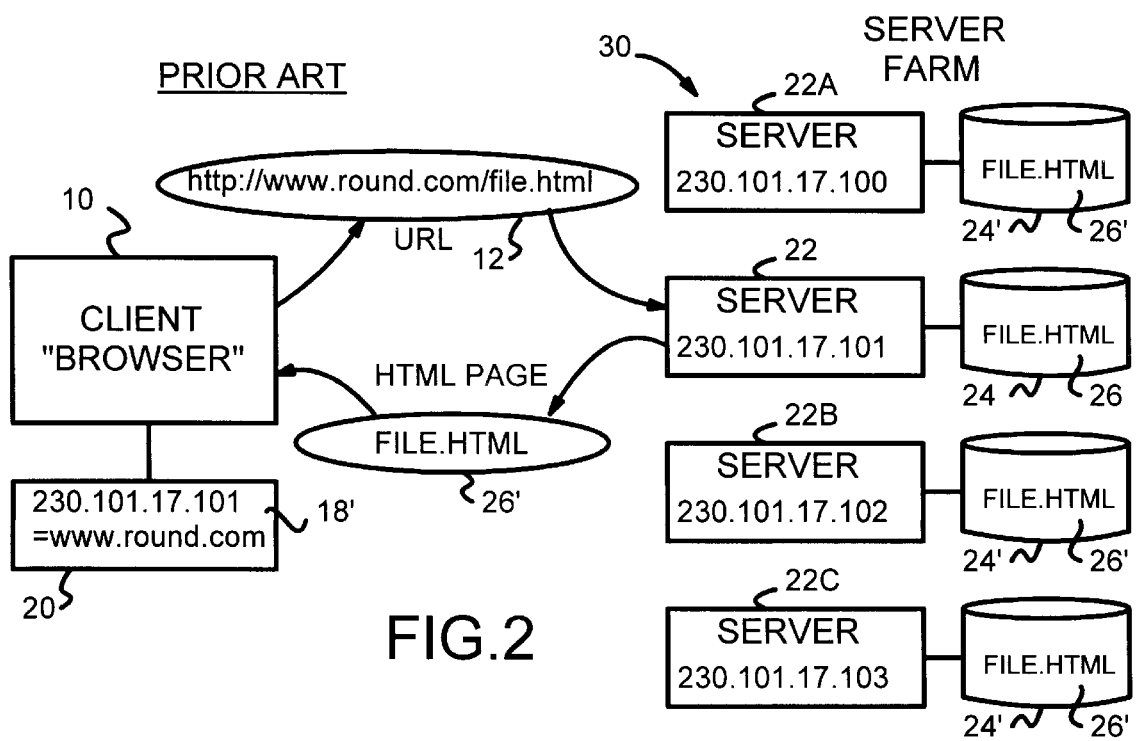
FIG. 2

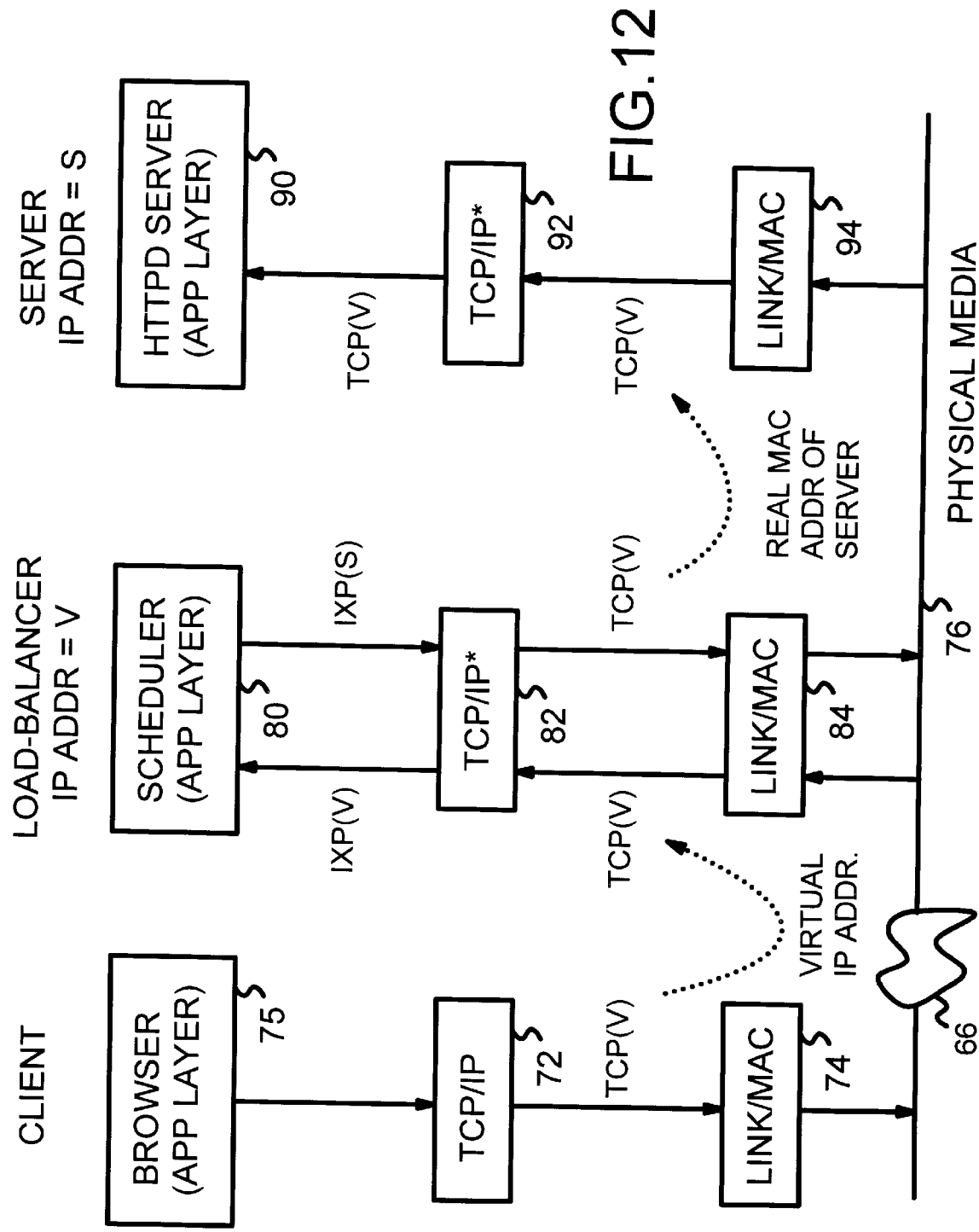

WORLD-WIDE-WEB SERVER WITH DELAYED RESOURCE-BINDING FOR RESOURCE-BASED LOAD BALANCING ON A DISTRIBUTED RESOURCE MULTI-NODE NETWORK

BACKGROUND OF THE INVENTION—FIELD OF THE INVENTION

This invention relates to network servers, and more particularly to Internet Servers.

BACKGROUND OF THE INVENTION— DESCRIPTION OF THE RELATED ART

Use of the global network known as the Internet has skyrocketed. Advertisers commonly feature their Internet addresses in television, billboard, and magazine ads. Consumers with a remote computer can access the Internet using client software known as a browser. Explosive growth is occurring in the part of the Internet known as the World-Wide Web, or simply the "web". The web is a collection of millions of files or "web pages" of text, graphics, and other media which are connected by hyper-links to other web pages. These may physically reside on a computer system anywhere on the Internet—on a computer in the next room or on the other side of the world.

These hyper-links often appear in the browser as a graphical icon or as colored, underlined text. A hyper-link contains a link to another web page. Using a mouse to click on the hyper-link initiates a process which locates and retrieves the linked web page, regardless of the physical location of that page. Hovering a mouse over a hyper-link or clicking on the link often displays in a corner of the browser a locator for the linked web page. This locator is known as a Universal Resource Locator, or URL.

Background of URL's, IP Addresses, HTML, HTTP

The URL identifies a domain, a host within that domain, and sometimes a resource or file within a directory structure on the host computer. Domains can be thought of as a group of computers, such as all computers on a company's network. For example, the domain "ibm.com" identifies a domain for the commercial company IBM, which may include thousands of individual computers. Typically the URL identifies only those computers which are servers on the world-wide web by prefixing the domain with a host name. Thus the URL "http://www.ibm.com" identifies an individual host computer within the ibm.com domain which operates as a world-wide-web server for IBM. "HTTP" tells the host to use the hyper-text transfer protocol while delivering files over the Internet. The files delivered can be from resources such as database queries or execution of scripts by the host as well as traditional files.

A web server site may contain thousands of individual web pages. The location of the file or resource containing a desired page is identified by appending a directory-path file name to the host and domain names in the basic URL to form a new URL. Thus the URL "http://www.ibm.com/dira/dirb/dirc/intro.html" identifies a hyper-text markup-language (HTML) file called "intro.html" which resides on a host named "www" within the ibm.com domain. The file resides in the dira directory and the dirb/dirc subdirectory. Often this HTML file contains references to other files which are loaded automatically by the client's browser.

While the URL is used to locate a file on a host within a domain, it does not contain a physical address for the host computer. Addresses of computer machines on the Internet are specified using a 32-bit numeric identifier known as the Internet-Protocol (IP) address. Each computer is typically assigned a different IP address so that no two machines have the same IP address. The IP address is often written as four decimal numbers separated by periods. Each decimal number represents an 8-bit binary number, from zero to 255 in decimal notation. Thus a computer in IBM's domain might have the IP address 209.180.55.2 while another computer in that domain might have the address 209.180.55.103.

Client Browsers Accessing Web Servers

FIG. 1 is a diagram of a client browser looking up the IP address of a host specified in a URL. Users of a remote computer use client software known as an Internet browser or simply a browser. Popular browsers include Netscape Navigator by Netscape Communications, Inc. of Mountain View, Calif. and Internet Explorer by Microsoft Corp. of Redmond, Wash., although many other browsers and other types of client software are used.

Browser 10 initiates a communication session with a remote server by the user selecting a URL, perhaps by mouse-clicking on a hyper link to a new web page. Host name 11, "www.round.com", in the URL "http://www.round.com/file.html", is sent to domain-name-system (DNS) server 14, which is a special Internet server with look-up table 16. DNS server 14 is often a special server at an Internet Service Provider which contains most or all domain names on the entire Internet, or in a local region of the Internet. One DNS server may have to refer the request to another DNS server for unknown host-names.

DNS server 14 looks through look-up table 16 and finds an entry for the host www.round.com. This entry contains a physical IP address 18 for the web-server host in the domain round.com. This IP address 18 230.101.17.101 is returned to browser 10. Browser 10 then stores this IP address in client cache 20 for future use, a process known as browser caching of the IP address.

Browser 10 then uses cached IP address 18' to initiate a communication session with the remote computer which physically has the desired web page, the www.round.com server having the file.html file. FIG. 2 shows a browser using a cached IP address to retrieve a file from a remote server in a server farm. Browser 10 reads the cached IP address 18' from client cache 20 and uses cached IP address 18' to initiate a communication session with remote server 22. Once the session with server 22 is established, URL 12 is sent to server 22. Server 22 then accesses disk 24 which includes requested file 26, the file.html web page. A file copy 26' of requested file 26 is sent back to browser 10, which re-constructs the web page from file copy 26' and displays the web page to the user. Other files such as graphic image files may also be transferred which were not directly requested by the URL, but are referenced by the file.html file.

Server Farms for Large Web Sites Mirror Content

While some smaller web sites can be served from a single computer, larger web sites require multiple computer machines acting as servers. Some web sites receive as many as one million requests or "hits" per hour, requiring many workstation computers.

FIG. 2 shows server farm 30 which contains server 22 serving browser 10, and servers 22A, 22B, 22C which are servicing other browsers (not shown). Servers 22A, 22B, 22C each contain their own disks 24', each with a copy of all the web pages in the site, including requested file 26. Server farm 30 is basically a group of replicated servers which can service requests from multiple browsers. Each server has a copy of the entire web site. Any server can service any request since the content is "mirrored" on all servers.

Each machine typically has its own unique IP address. Since a domain can have many computer machines with many IP addresses, some way to provide to a client one of the many server machines' IP address is needed. One simple approach is known as rotating DNS or DNS round-robin load-balancing.

DNS server 14 of FIG. 1 contains look-up table 16 which is used to return IP addresses to host-lookup requests from client browsers. Look-up table 16 contains entries for different host names. The entry for a host name specifies the IP addresses for that host and each entry can contain several IP addresses for that host. The entry for www.round.com host on the domain round.com contains four IP addresses:

230.101.17.100
230.101.17.101
230.101.17.102
230.101.17.103 for the four servers 22A, 22, 22B, 22C of server farm 30 serving the www.round.com web site. When a client requests a DNS look-up, one of these IP addresses is chosen in a round-robin fashion. Each time a different client looks up the host www.round.com, a different IP address is returned until all the available IP addresses are used. Then the first IP address is returned again. Thus the first browser is sent the IP address for server 22A, the second browser is sent the IP address for server 22, the third browser sent the IP address for server 22B, and the four browser sent the IP address for server 22C. The fifth browser request to DNS server 14 is sent the first server 22A, and so on in a round-robin fashion.

Each DNS server operates independently of other DNS servers. Thus optimal load balancing is not always achieved.

Other more sophisticated assignment schemes have been used, such as "load-balancing DNS" which sends requests to servers based on a balancing algorithm which attempts to balance the load on each server. With this approach more powerful servers could be assigned more requests than weaker servers.

IP Addresses of Servers Cached on DNS Server

DNS servers 14 (FIG. 1) often cache the results of domain-name lookups which were passed or forwarded to other DNS servers for completion. The administrator of the www.round.com web site has no way of actively updating the contents of many DNS caches containing IP addresses of servers in server farm 30. Instead, the administrator must rely on the remote DNS servers periodically flushing their own cached IP addresses and looking up the www.round.com host again. DNS servers may flush their cached IP addresses every few minutes or not for several weeks. IP addresses can thus remain in a DNS server's cache long after the server with the cached IP address is removed from service. The IP address of the removed server can continue to be assigned by the DNS server until the cached entry is replaced or flushed.

For the example in FIG. 3, when server 22C crashes, its IP address 230.101.17.103 remains in use in DNS server caches. Users that look-up the www.round.com host name can be assigned the IP address of crashed server 22C. Users sent the IP address of crashed server 22C are unable to access server farm 30, even though several other servers 22A, 22, 22B at server farm 30 are operational.

DNS Caching Blocks Some Users From Partially-Crashed Web Site

Several hours or even days may be required to flush the IP address of the crashed server 22C from all DNS caches. Thus DNS servers can continue to send the IP address of the crashed server to browsers long after the server has crashed. Browsers attempting to use this IP address and connect with the crashed server receive no response from the www.round.com web site. These browsers are frozen out of the www.round.com web site.

Since the browser itself caches the IP address from the DNS server until the browser application is closed, browsers can still attempt to access a crashed server after the crash has occurred. FIG. 3 shows a browser using a cached IP address to access a crashed server which is not responding. Browser 10A had previously cached IP address 18C for server 22C for the www.round.com host. When browser 10A attempts to connect to www.round.com, server 22C is accessed. No response is received from server 22C since the server is not functioning. To Browser 10A, the web site www.round.com appears to be non-functional, even though to another browser 10, the web site is functional.

Though the user of browser 10A may repeatedly try to connect to the www.round.com web site, each time no response is received until server 22C is fixed. Since DNS server 14 of FIG. 1 may continue to use the IP address of the crashed server 22C, many users may be locked out from the web site, even though other users can access the site.

When browser 10A also caches IP address 18C, the browser may not be informed that the IP address is no longer valid even after DNS server updates its own cache. These browser caches may persist for several hours, preventing the user from accessing the web site. Should the server 22C be removed from service permanently, perhaps being re-assigned to another web site, the user is effectively blocked from accessing the web site until the user flushes his IP cache, which may not occur until the user exits the browser application.

Of course, with a large server farm, the loss of one server blocks out only 1/N of the users, where N is the number of servers in the server farm. Thus for FIG. 3, one-fourth of the current users are blocked out while ¾ths of the current users have access to the web site. One-fourth of the new users looking up the host on a DNS server which still uses the old IP address of the crashed server are also blocked from the web site.

Router-Based Web Site

An approach which mitigates some of these problems inserts a multiplexer or router between the browser clients and the server farm. FIG. 4 illustrates a router-based server farm. A single IP address of router 32, 230.101.17.200, is available to all DNS servers as the single IP address for the web site. Browser 10 caches this IP address as cached IP address 34. Requests from browser 10 are sent to router 32 since cached IP address 34 points to router 32.

Router 32 receives all packets in the transmission from browser 10. Router 32 might be a dedicated personal computer (PC) which uses an algorithm to determine which of servers 36A, 36, 36B, 36C in server farm 38 should service the request from browser 10. Router 32 may use a fairly complex load-balancing scheme which takes into account requests from other browsers and the capability of each server when some servers are powerful workstations while other servers are older, slower PC's.

All the packets in the session from browser 10 received by router 32 are re-transmitted to server 36, with the destination IP address changed to the IP address for server 36, 230.101.17.101. Server 36 retrieves the requested file 26 from its local disk 24 and transmits it back to router 32, which then re-transmits the file to browser 10.

When a server crashes, such as crashed server 36C, only those browsers which are currently connected to server 36C experience server failure. Client caching of the router's IP address causes all new sessions to be routed to router 32; only sessions in progress to crashed server 36C receive no response from the web site. Thus when one of the servers fails, only 1/N of the currently active requests fail, where N is the number of servers. New requests do not fail since router 32 detects when crashed server 36C is not functioning and no longer directs new requests to the down server.

A commercial embodiment of a router-based web server has been announced by SOS Corp. of New York, N.Y., under the name "HydraWEB", and product literature indicates that a patent is pending. A second commercial embodiment is the Cisco Local Director, manufactured by Cisco Systems of San Jose, Calif. Each server 36A, 36, 36B, 36C contains a local copy of all content on the web site on disks 24, 24'. Mirroring the full content of the site to all servers is a disadvantage for web sites with a large amount of content, because of the size and cost of the local disks. Certain web applications such as multimedia and video delivery can require a particularly large amount of disk space. These applications are expensive to implement and thus minimizing the number of copies at the server farm is desirable.

Another disadvantage with the router web site is that all data transfers go through router 32. Since many web pages contain graphics or even video or sound, the amount of data transferred from the server through the router to the browser is large. Router 32 must be fast and efficient to handle load balancing and routing of incoming and outgoing packets. As the web site becomes more popular and traffic grows, router 32 can quickly become a bottleneck and limit performance of the web site. Router 32 is also a single point of failure.

Load-Balancing Granularity Determines Users Affected by Server Failure

For round-robin DNS, the IP address of the web server is assigned once to the client browser and all subsequent accesses use this IP address until the browser's client cache is purged. This is client-level load-balancing granularity, since each client is assigned one server machine for all requests from that client. When the assigned server crashes, the clients using that server are blocked for all future requests until the client application is closed.

The router-based web site has request-level load-balancing granularity. Servers are assigned to handle individual requests from browsers. When the assigned server crashes, the outstanding requests to the server are blacked out but clients can still access other servers in the farm.

Server Problems Plague the Internet

Many Internet users can testify to the utter frustration when the "SERVER NOT RESPONDING" error message is displayed on their browser while trying to connect to a web site. Users often blame the company which administers the unavailable web site. Web sites are not as fault-tolerant as possible despite large investments in replicated servers. An intelligently-designed web-site architecture with better fault-tolerance is needed.

It is desired to reduce the frequency of "SERVER NOT RESPONDING" messages that Internet users often receive. While many web sites use server architectures such as DNS round-robin and router-based load-balancing, a more efficient and fault-tolerant web-site architecture is desired. It is desired to avoid the data bottleneck and single point of failure at the router for router-based web sites. It is also desired to use inherent characteristics of web traffic to more efficiently design a web-site architecture. Mirroring the content of the entire web site to all servers at the site is undesirable, but having differing content on different servers is desired while still performing load balancing. A web site with request-level load-balancing granularity is desired so that fewer users experience a browser lock-up when a server at the web site fails. A web site that can use the standard DNS mechanism is desired to overcome the limitations of DNS caching and complex maintenance of round-robin DNS.

SUMMARY OF THE INVENTION

A web site sends resources to a browser on a client connected to a computer network. The web site has a network connection point for receiving incoming data packets from the computer network and for transmitting outgoing data packets to the computer network. A local network is coupled to the network connection point and transfers data packets. A plurality of network nodes contain web servers with resources. The plurality of network nodes is connected to the local network. The plurality of network nodes transmit the resources as outgoing data packets over the local network to the network connection point through the computer network to the client.

A balancer network node contains a load balancer that receives the incoming data packets transmitted over the local network from the network connection point. The load balancer determines an assigned server in the plurality of network nodes to respond to a request from the client contained in an incoming data packet. The load balancer transfers a connection to the client to the assigned server.

The balancer network node containing the load balancer is connected to the network connection point by the local network which is also connected to the plurality of network nodes. Thus the incoming data packets are routed to the balancer network node but outgoing data packets bypass the balancer network node.

In further aspects the balancer network node is in the plurality of network nodes containing web servers. The web site is addressable by one network address for all web servers in the plurality of network nodes containing web servers. Each network node in the plurality of network nodes contains only a portion of all the resources at the web site; all resources at the web site are not mirrored to all network nodes at the web site.

In still further aspects of the invention a content means stores an indication of which network nodes in the plurality of network nodes contain each resource. A URL means receives incoming data packets from the client which contain a request for a resource. A requested resource is determined from the incoming data packets. Compare means is coupled to the content means and is coupled to the URL means. It compares the requested resource to the indication of which network nodes in the plurality of network nodes contain each resource. A list of network nodes containing the requested resource is outputted.

Balancing means receives the list of network nodes containing the requested resource. It chooses as an assigned node one of the network nodes in the list of network nodes. Thus the load balancer chooses an assigned node based on the resources contained by each network node. The load balancer performs resource-based load balancing.

In other aspects a delay means in the load balancer delays assignment of the assigned node until an incoming data packet containing the request for the resource is received. Thus load balancing is delayed.

In other aspects the invention is a method which makes a connection and sets up a session between the client and a load balancer at a web site. The load balancer waits for a URL request from the client once the load balancer has made the connection with the client. It receives the URL request from the client and decodes the URL request to determine a requested resource. An identifier for the requested resource is compared to identifiers for resources located on a plurality of nodes and a first subset of the plurality of nodes is determined which contain the requested resource. The URL request is assigned to an assigned node in the first subset of the nodes which contain the requested resource and the connection and the session setup are transferred to the assigned node which contains the requested resource. The assigned node reads the requested resource and transmits the requested resource to the client. Thus the assigned node is selected based on a location of the requested resource determined from the URL request.

In further aspects the packets received from the client are TCP/IP packets having a destination IP address which is a virtual IP address of the load balancer. The virtual IP address of the load balancer is changed in the packets to a real IP address of the assigned node and the packets are passed to a modified IP layer. The real IP address determines a physical route from the load balancer to the assigned node over a network and a physical network address is generated for the assigned node and the physical network address is attached to the packets. The real IP address in the packets is changed back to the virtual IP address of the load balancer before transmission of the packets with the physical network address. Thus the physical network address is generated from the real IP address of the assigned node, but the packets are transmitted to the assigned node containing the virtual IP address of the load balancer.

BRIEF DESCRIPTION OF THE DRAWINGS

FIG. 1 is a diagram of a client browser looking up the IP address of a host specified in a URL.

FIG. 2 shows a browser using a cached IP address to retrieve a file from a remote server in a server farm.

FIG. 12 is a diagram of network layers showing a packet sent from the client to the server which is intercepted by the load balancer.

DETAILED DESCRIPTION

The present invention relates to an improvement in Internet and Intranet server farms. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that most traffic at web sites is inherently asymmetric. Users download huge amounts of data and graphics from a web site, but provide only small amounts of data in the form of requests to the web site. The amount of data flowing out of a web site far surpasses the trickle of data flowing into the site.

Figure 5:
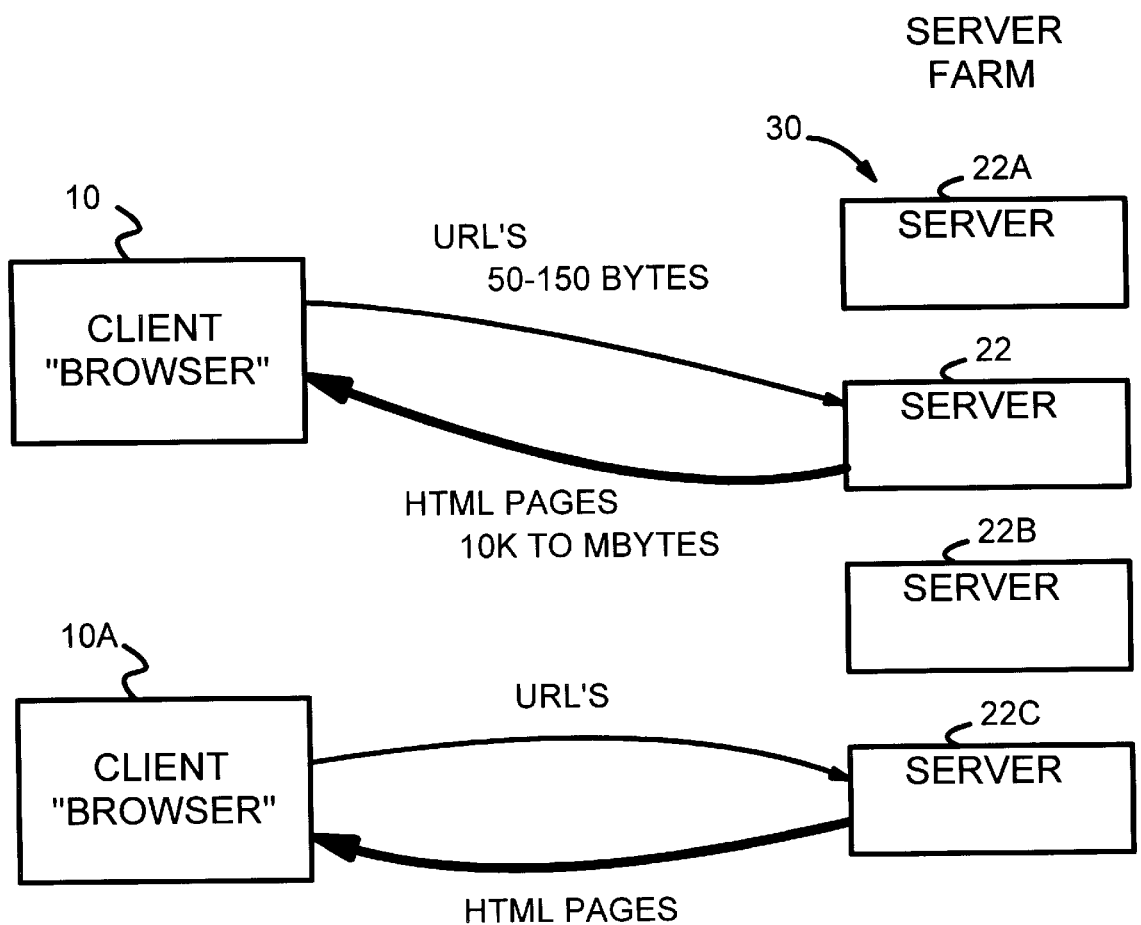
FIG. 5 highlights the asymmetric nature of data transfer at a world-wide-web site.

FIG. 5 highlights the asymmetric nature of data transfer at a world-wide-web site. Client browser 10 operates an Internet browser application which connects to server 22 in server farm 30. Client browser 10A also operates an Internet browser application which connects to server 22C in server farm 30, and other browsers (not shown) may also be connected to this and other servers 22A, 22B.

Browser 10 imbeds requests and commands and a small amount of data in URL's, which are transmitted to server 22. Each URL contains about 50 to 150 bytes of information, excluding IP addresses and packet headers and other network overhead. A URL often contains information other than a requested file. For example, when the user of browser 10 mouse-clicks on a bitmap image displayed on a web page, the relative coordinates of the mouse's location when the mouse click occurred are included in the URL: http://www.round.com/cgi-bin/coo.cgi?102,315. Server 22 decodes the coordinates in the URL and determines where on the web page the user mouse-clicked.

The server then performs the action requested, such as opening and transmitting another web page to browser 10.

Other information sometimes embedded in the URL includes passwords or search text that the user types in, or name and address information typed in. Since the amount of data that a user types in is limited, the number of bytes for this data is small.

Traffic from server 22 to browser 10 consists of large data files which are used to reconstruct the web pages on browser 10. Since many web sites feature colorful graphics, large graphics files are typically transmitted from server 22 to browser 10. As new types of media become commonplace, sound, animation, and video files will accompany the graphics and HTML files being transmitted from server 22 to browser 10. Smaller web pages may result in only 10 K-bytes of data returned to browser 10, while more graphical web pages cause larger files to be transmitted, perhaps to several mega-bytes. Video and sound file can easily exceed several mega-bytes.

The result is that only 50 to 150 bytes of data are typically transmitted from browser 10 to server 22, while tens or hundreds of thousands of bytes of data are transmitted in the reverse direction, from server 22 to browser 10. In the near future, when sound and video become common, the reverse traffic will increase to several mega-bytes per 100-byte request. At that point the bandwidth of the reverse traffic will be about a thousand times the bandwidth from browser to server.

Outgoing Data Bypasses Load-Balancer

Figure 6:
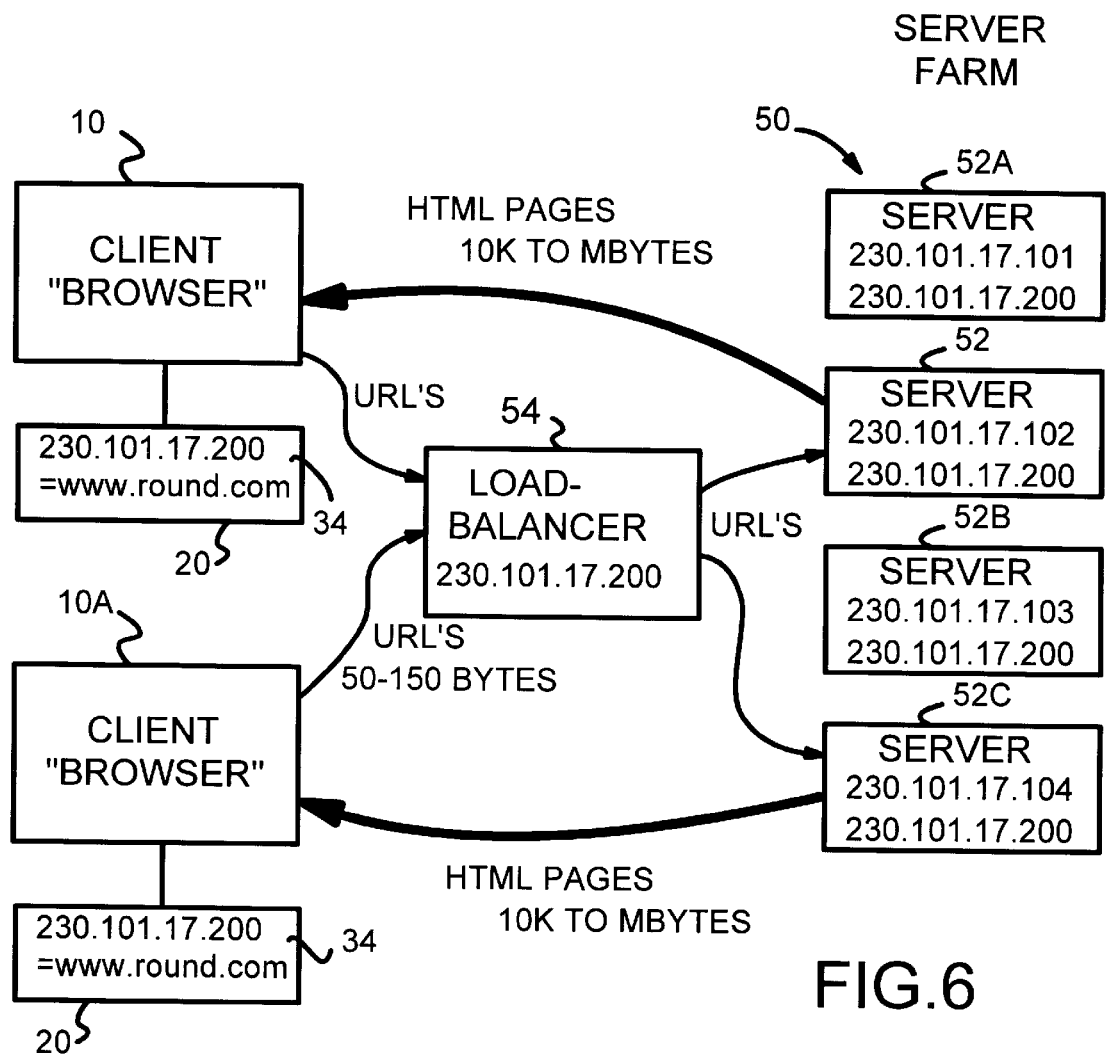
FIG. 6 is a diagram of a web server which asymmetrically routes incoming traffic through a load-balancer while bypassing the load-balancer for files transmitted back to client browsers.

FIG. 6 is a diagram of a web server which asymmetrically routes incoming traffic through a load-balancer while bypassing the load-balancer for data transmitted back to client browsers. Browsers 10, 10A cache a virtual IP address 34 in client cache 20. Virtual address 34 (230.101.17.200) is an IP address that identifies all servers at the web site. Unlike a conventional IP address which is unique to an individual host or server, the virtual IP address identifies the web site in its entirety.

External routers are configured to deliver all incoming URL's and network traffic from browsers 10, 10A to load-balancer 54, which has the virtual IP address.

Load-balancer 54 keeps track of which requests are being processed by each server in server farm 50, and attempts to balance the load of requests among the servers. As is subsequently discussed in more detail, load-balancer 54 establishes the connection with browser 10 and waits for the URL before performing load balancing and assigning the request to a server. The connection and the URL request is then migrated to the assigned server. For example, the request from browser 10 is assigned and migrated to server 52, while the request form browser 10A is assigned and migrated to server 52C.

Unlike a router-based web site, the IP addresses of packets are not changed to the assigned server's local IP address. Instead, each server 52A, 52, 52B, 52C is assigned an additional IP address, the virtual IP address. A low-level Network-Interface Card (NIC) address is used to route the packets to the assigned server. Each server accepts any packet with either its local IP address or the virtual IP address. Incoming packets from the Internet backbone are routed to load-balancer 54 because they are given the NIC address of load balancer 54 by the Internet connection router (not shown).

Server 52 sends HTML files for the web page back to browser 10 by using the source IP address in the packets received from load-balancer 54. Since load-balancer 54 does not modify the higher-level TCP/IP packets transmitted to server 52, server 52 appears to be receiving these packets directly from browser 10. Server 52 uses the browser's IP address as the destination IP address for outgoing packets, but the virtual IP address as the source address of these packets. Outgoing packets do not go through load-balancer 54. The bandwidth of traffic through load balancer 54 is much less than through router 32 of FIG. 4 since only the relatively small incoming requests are routed through load balancer 54 while outgoing data bypasses load balancer 54.

Load balancer 54 can handle multiple requests from multiple browsers since each request is relatively small. Outgoing packets from each server do not have to have their IP addresses altered since each server uses the virtual IP address as the source address of outgoing packets. Thus the larger outgoing traffic of large mega-byte-sized files is bypassed around load-balancer 54. Multiple connections to the Internet can be provided for the outgoing traffic, since a single router/load-balancer is not required for all traffic.

NIC Address Encapsulated in TCP/IP Packet

Figure 7:
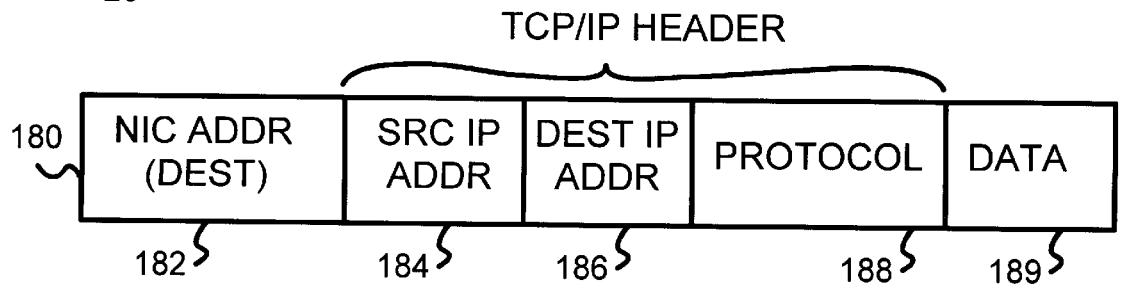
FIG. 7 is a diagram of a TCP/IP packet transmitted through a local-area network (LAN).

FIG. 7 is a diagram of a standard TCP/IP packet transmitted through a local-area network (LAN). Packet 180 contains NIC address 182, which contains the low-level NIC address (e.g. Ethernet's media-access-controller (MAC) address) of the next destination station in the route to the final destination indicated by destination IP address field 186. Several destination stations may exist on the route to the station having the destination IP address. Each intermediate station reads the destination IP address and determines the next station in the route. The NIC address of this next station is changed to the NIC address for the next leg of the route, but the IP addresses are not changed.

The source station's IP address is contained in source IP address field 184, while the packet's type or protocol is included in protocol field 188. For Internet packets, the protocol is TCP, but other protocols may be used for local LAN traffic. The data being transmitted by the packet is contained in data field 189. A frame checksum (not shown) may be appended. Source IP address field 184, destination IP address field 186, and protocol field 188 are the IP header attached to the data by the IP layer, while NIC address 182 is attached by the data-link layer. Packet 180 includes a TCP/IP header which includes flags indicating the type of packet (SYN, ACK, PUSH, RST, FIN). A sequence number is also included in the TCP/IP header to keep track of packets received.

Larger data files must be broken into several packets which are transmitted separately and then re-assembled. A typical Ethernet packet can contain up to 1500 bytes.

Figure 8:
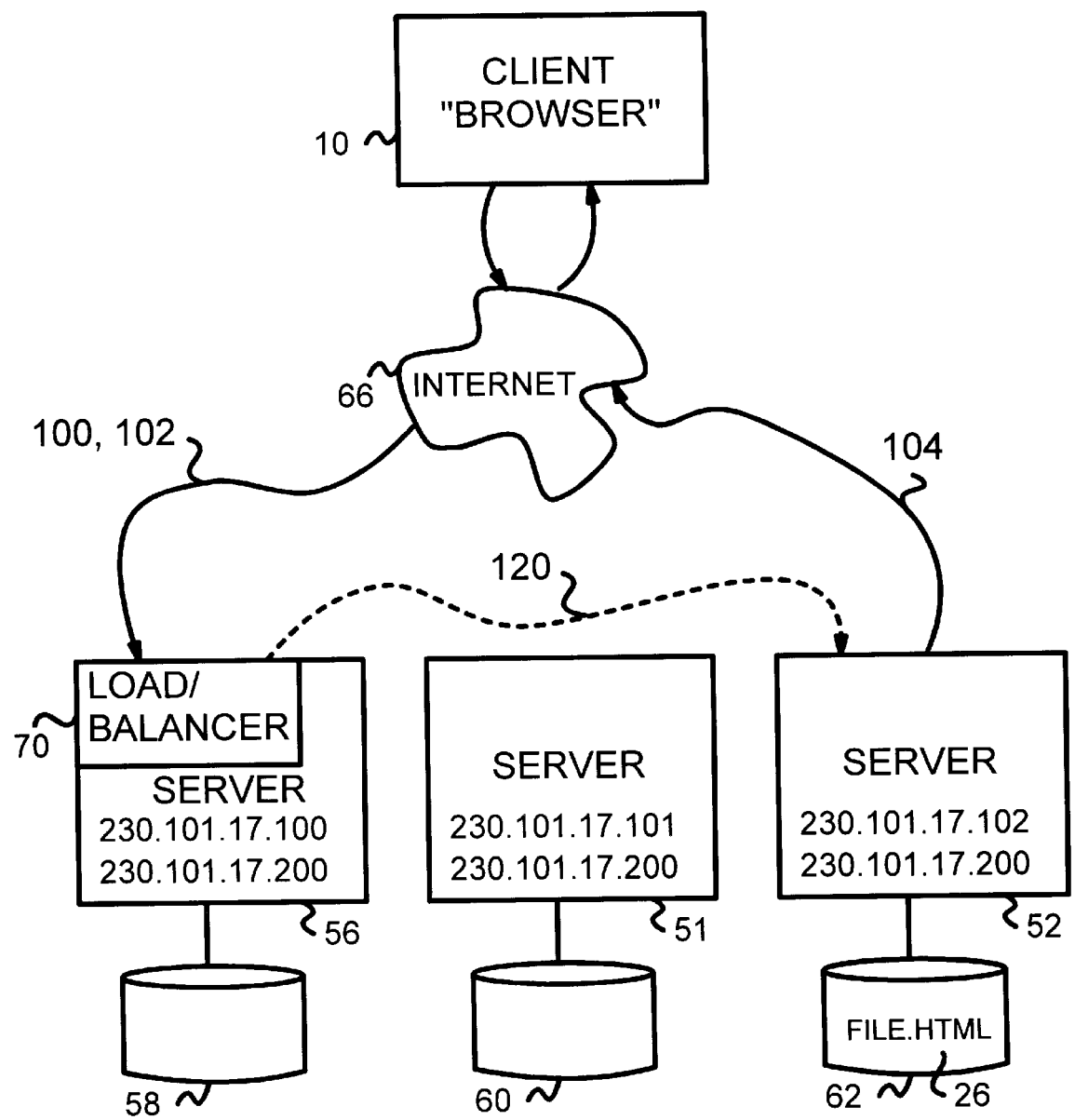
FIG. 8 is a diagram illustrating TCP state migration of a connection from the load balancer to a server node.

TCP Connection Migration—FIG. 8

FIG. 8 is a diagram illustrating TCP state migration of a connection from the load balancer to a server node. Browser 10 connects through Internet 66 to load balancer 70 and sends a URL request 102 once the connection 100 is made. Load balancer 70 does not have to be a separate, dedicated router or PC, and is shown as a software application running on server 56. Load balancer 70 can use many variations of balancing algorithms to determine which server 56, 51, 52 should service the new URL request 102. Load balancer 70 determines that the request should be assigned to server 52. The connection and URL request are migrated from load balancer 70 to server 52 using TCP state migration 120. Server 52 accesses disk 62 to read requested file 26 and sends a copy of requested file 26 to browser 10 through Internet 66 as data transfer 104.

Resource-Based Load Balancing

Each server 56, 51, 52 has a local disk 58, 60, 62, which contains different content. For example, only disk 62 contains requested file 26. Load balancer 70 maintains a directory table of the locations of different files and resources on the web site. Load balancer 70 determines that only server 52 and not servers 56, 51 can handle the request. The entire content of the web site does not have to be mirrored to each server's hard disk as in the prior art. Some of the more frequently accessed files and resources, such as the home page, may be replicated to all servers, but less-frequently accessed files and pages may be located on a single node or a few nodes. Other web sites resources may include dedicated servers with specific resources such as databases of built-in application-programming interfaces (API's) to interface with user-defined programs, or software licenses to run particular programs on particular servers.

Prior Art Load Balancing Performed Before URL is Parsed

Figure 3:
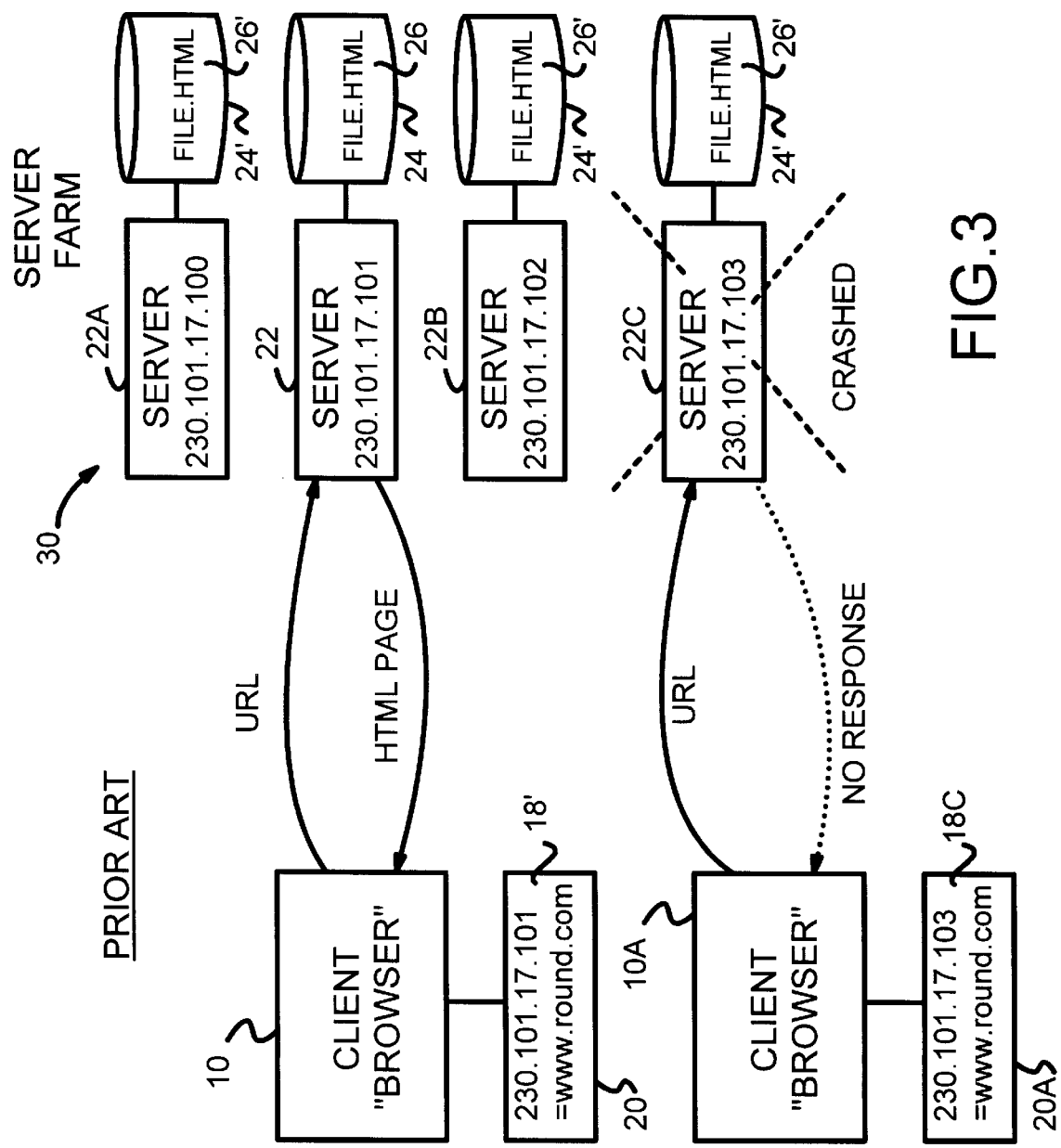
FIG. 3 shows a browser using a cached IP address to access a crashed server which is not responding.
Figure 4:
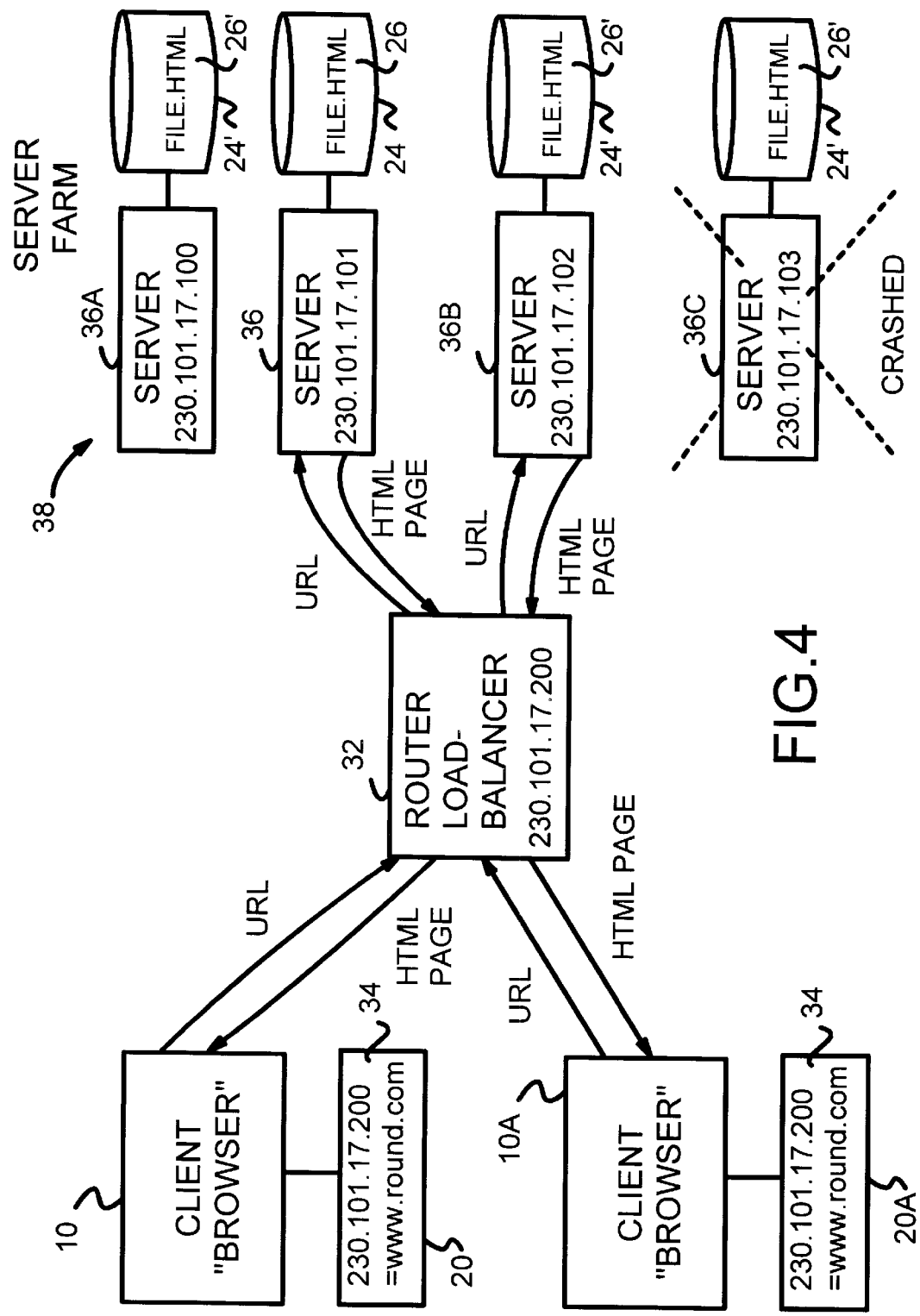
FIG. 4 illustrates a router-based server farm.
Figure 9:
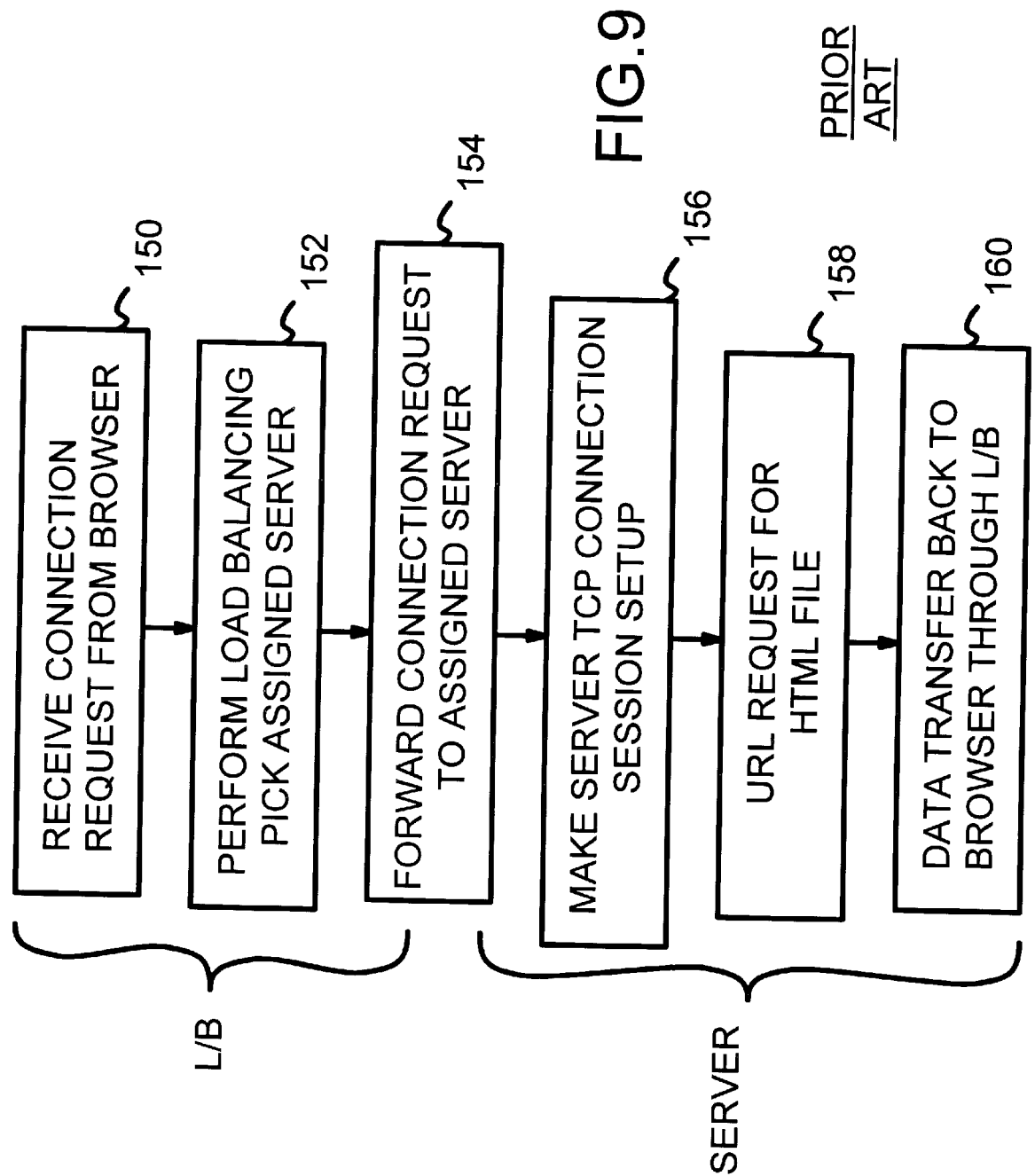
FIG. 9 is a flowchart of processing a browser request by a prior-art router-based load balancer such as shown in FIG. 4.

FIG. 9 is a flowchart of processing a browser request by a prior-art router-based load balancer such as shown in FIG. 4. The browser first attempts to make a connection with a server at the web site by sending a SYN packet which requests that a connection be made, step 150. A SYN packet has its SYN flag set in the TCP header. The router/load balancer receives this request and performs load balancing based on the load of each server in the server farm. Load balancing selects an assigned server for this new request, step 152. The router/load balancer then forwards packets to the assigned server, step 154.

The assigned server then makes the connection with the browser, step 156, by returning an SYN/ACK acknowledge packet to the browser by first routing it through the router. The browser responds with an ACK packet and then with a URL request, step 158. This URL packet is received at the router and then re-transmitted to the assigned server. The assigned server parses the URL request to determine which files are requested and then transmits these files back to the browser through the router/load balancer, step 160.

Steps 150, 152, 154 are performed by the router/load balancer while steps 156, 158, 160 are performed by the assigned server. The router passes packets from the server through to the client's browser.

URL File Request Arrives After Load Balancing in Prior Art

Since load balancing is performed as soon as the first SYN packet is received, before the URL is sent, such prior-art load balancing cannot take into account the resource or file which is requested by the URL. All servers must have the same content, since the URL arrives after the server assignment has been made. The invention overcomes these limitations by delaying the assignment of the server until after the URL has been received.

Simple router-based load balancing does not allow for resource-based load balancing because the requested resource or file is not known when the connection is first made. The requested file is known once the URL is received and parsed, which occurs after the connection is made. The browser does not send the URL until the connection has been made and the server responds with an acknowledgment packet. The router approach of FIGS. 4, 9 forwards all packets to the assigned server, and the assigned server then makes the connection and sends the acknowledgment. Once the connection is made with the assigned server, then the browser sends the URL, which is forwarded by the router to the assigned server.

Delayed Load Balancing and TCP State Migration

Figure 10:
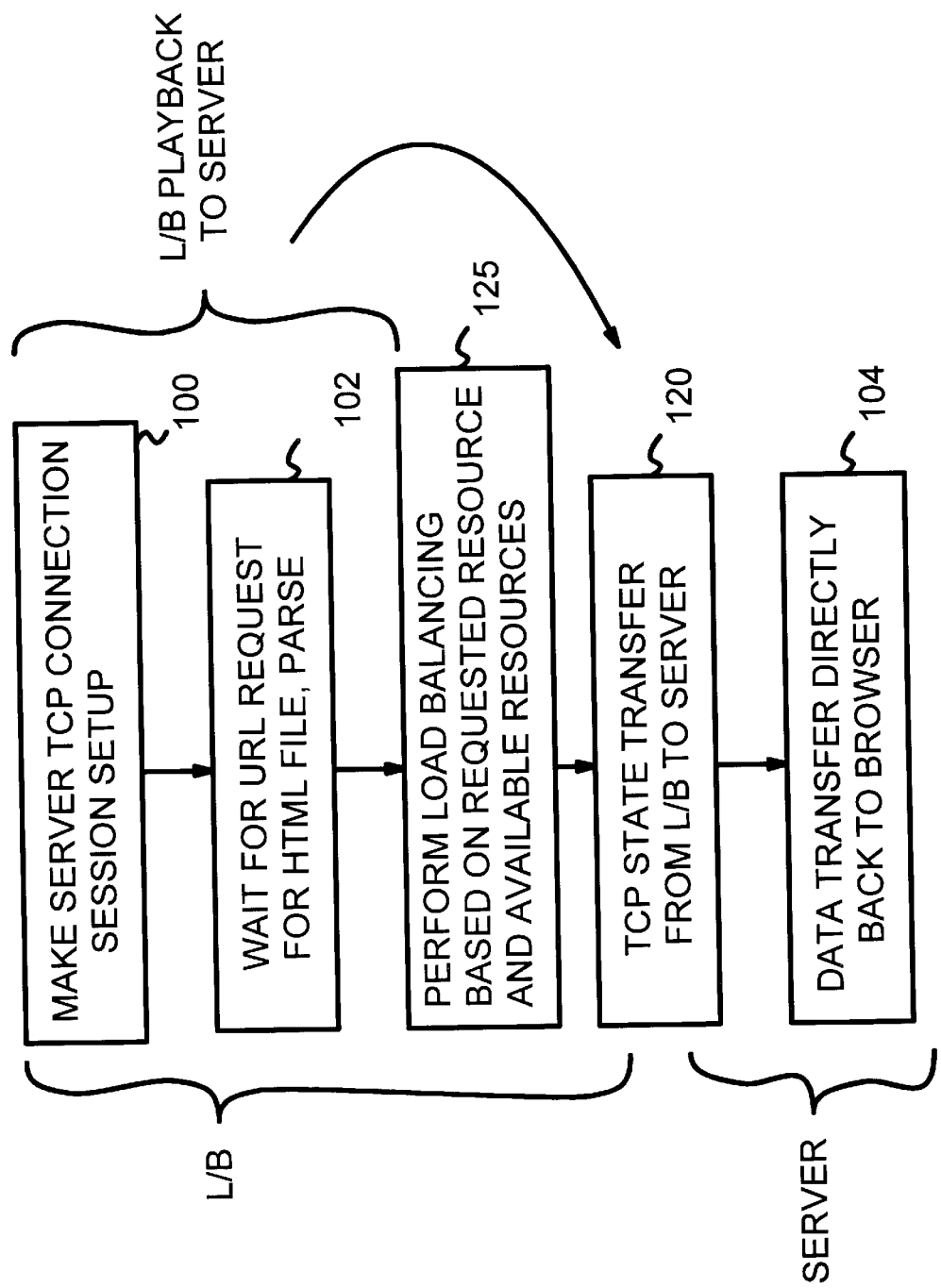
FIG. 10 is a flowchart showing load balancing and state migration delayed until the connection is made and the URL request received.

FIG. 10 is a flowchart showing load balancing and state migration delayed until after the connection is made and the URL request received. The TCP connection 100 is made between the browser and the load balancer by exchanging SYN and ACK packets. Once this connection is made, the load balancer waits until the browser sends the URL which indicates which file or resource is requested. Once the URL request 102 is received, the load balancer parses the URL to determine which resource is being requested. Based on the resource requested from parsing the URL, the load balancer determines which servers are best suited to serve the request. The load balancer then performs load balancing among the servers that can serve the request, step 125.

The load balancer then transfers the connection and the current TCP state to the assigned server, using TCP state migration 120. TCP state migration is not simply forwarding packets through as they are received. Instead the packets received are stored by the load balancer and then played back to the assigned server. The assigned server accesses its local disk to read the requested file and sends a copy of the requested file to the browser through the Internet as data transfer 104.

Figure 11A:
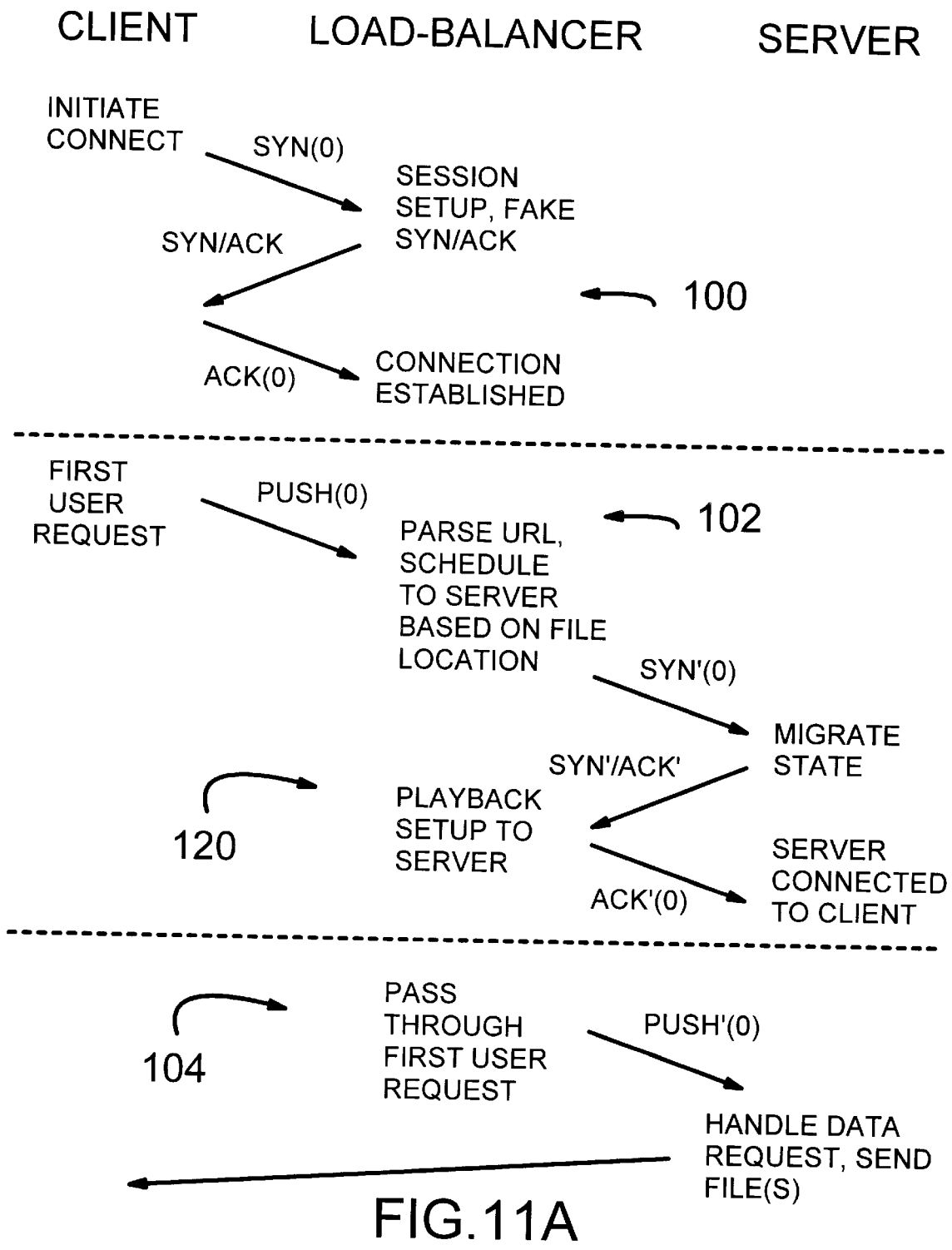
FIG. 11A is a chart illustrating packets transferred among the browser, load balancer, and the assigned server when establishing the connection and transferring the connection to the assigned server which responds to the URL request.

TCP State Migration—FIG. 11A

FIG. 11A is a chart illustrating packets transferred among the browser, load balancer, and the assigned server when establishing the connection and transferring the connection to the assigned server which responds to the URL request. A browser application running on a remote client initiates a connection by sending a synchronizing packet, SYN(0), to the virtual IP address of the web site. The SYN(0) packet is routed to the load balancer since it is an incoming packet, and the load balancer sets up a session with the browser by setting aside memory space and creating an entry in a session table. The load balancer replies with a SYN/ACK packet to the browser, and the browser replies with an acknowledgment packet, ACK(0). The SYN packet contains an initial sequence number which is determined by the browser's OS. The SYN/ACK packet contains acknowledgment number which is this initial sequence number incremented by one. At this point connection 100 has been established between the browser and the load balancer.

The load balancer saves all of the SYN and ACK packet information received. Since incoming packets are few and small in size, a large amount of storage is not necessary. The SYN and ACK packets are later played back to the assigned server for TCP state migration.

The browser then sends the first URL request 102 in a PUSH packet. A PUSH packet is identified by a PUSH flag being set in the TCP header. The load balancer parses the URL to get the file or resource name. Based on the requested resource, and the location of each resource in the web site, the load balancer determines which servers can serve the request, and then chooses the least busy of these servers as the assigned server.

The load balancer then transfers the condition or state of the connection to the assigned server in a process the inventors call "TCP state migration". TCP state migration is not visible to the browser since all transactions occur between the load balancer and the assigned server. The assigned server also uses the virtual IP address so the browser is not aware that the SYN/ACK came from the load balancer while the data comes from the assigned server.

TCP state migration 120 is performed by the load balancer playing back the SYN packet received from the browser and stored by the load balancer. The server responds with a SYN/ACK packet, which is intercepted and directed to the load balancer and not sent to the browser. The load balancer then sends the browser's stored ACK packet to the assigned server, and the assigned server is then connected directly to the browser, having the same TCP state as was established with the load balancer.

The load balancer then sends the packet(s) containing the URL request to the assigned server as packet PUSH(0)'. The server reads its local disk and sends the requested file to the browser as data transfer 104.

The load balancer then enters a pass-through state. Any further packets from the browser such as ACK packets for the received packets are passed through to the assigned server. The assigned server normally closes the connection immediately after the data has been sent to the browser.

Figure 11B:
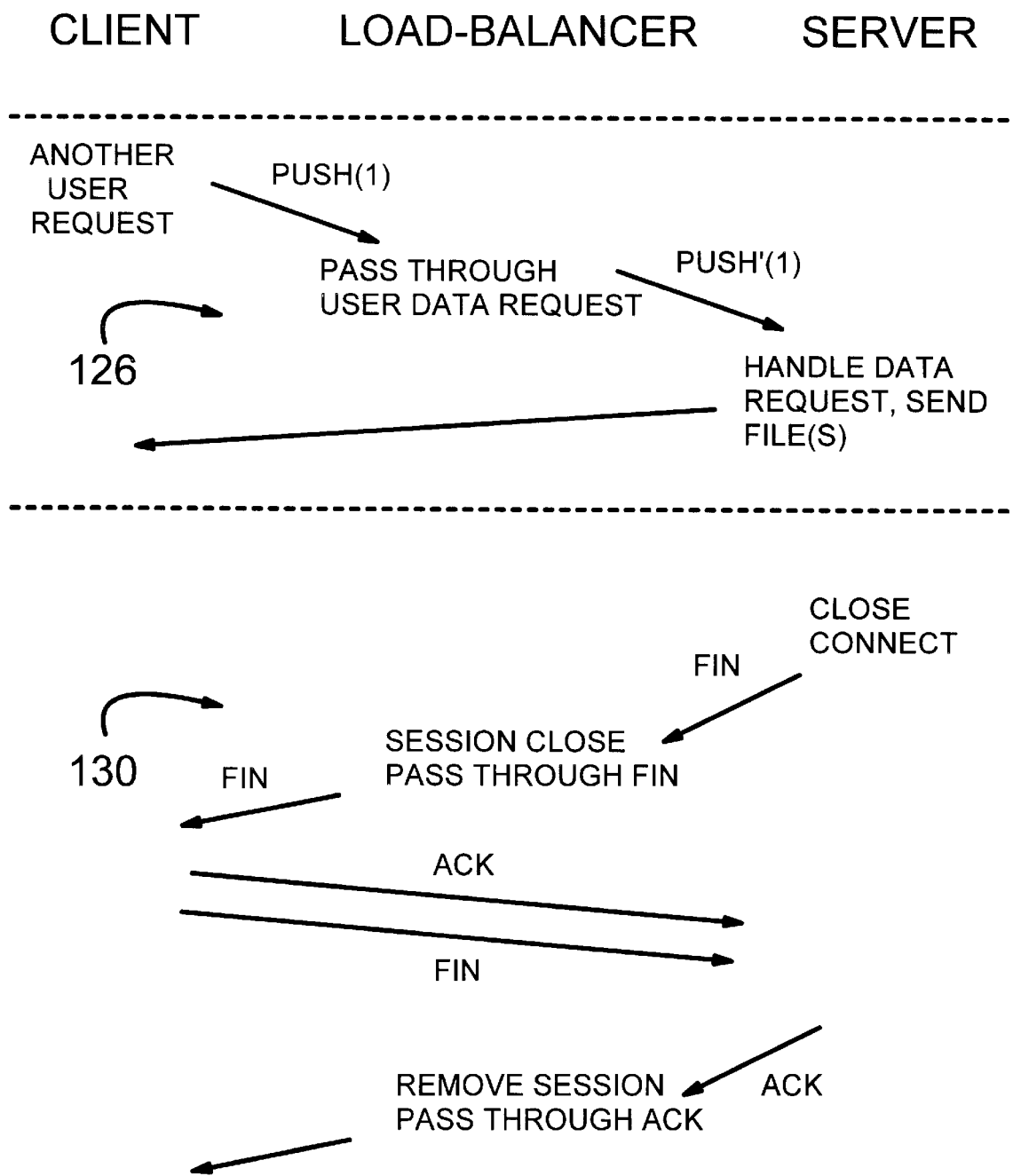
FIG. 11B shows the browser sending a second URL request, PUSH(1), to the load balancer, which is passed through to the assigned server as PUSH(1)'.

When the browser uses a "keep alive" mode, the server may not immediately close the connection. Additional requests may be sent to the assigned server. FIG. 11B shows the browser sending a second URL request, PUSH(1), to the load balancer, which is passed through to the assigned server as PUSH(1)'. The second request is then handled by the server by sending the requested files to the browser, step 126. Further requests are handled in a similar manner.

Should one of these subsequent requests be for a file not located on the assigned server's local disk, a local network can be used by the assigned server to access the requested files from other servers on the local network.

Finally, the server closes the connection 130 by sending a finish (FIN) packet which is intercepted and sent to the load balancer, which passes it through to the client. The client replies with an acknowledgment, ACK, and a FIN packet indicating that the browser is closing its end of the connection. The load balancer removes the session entry and the server assignment, and the assigned server closes the connection.

Figure 13:
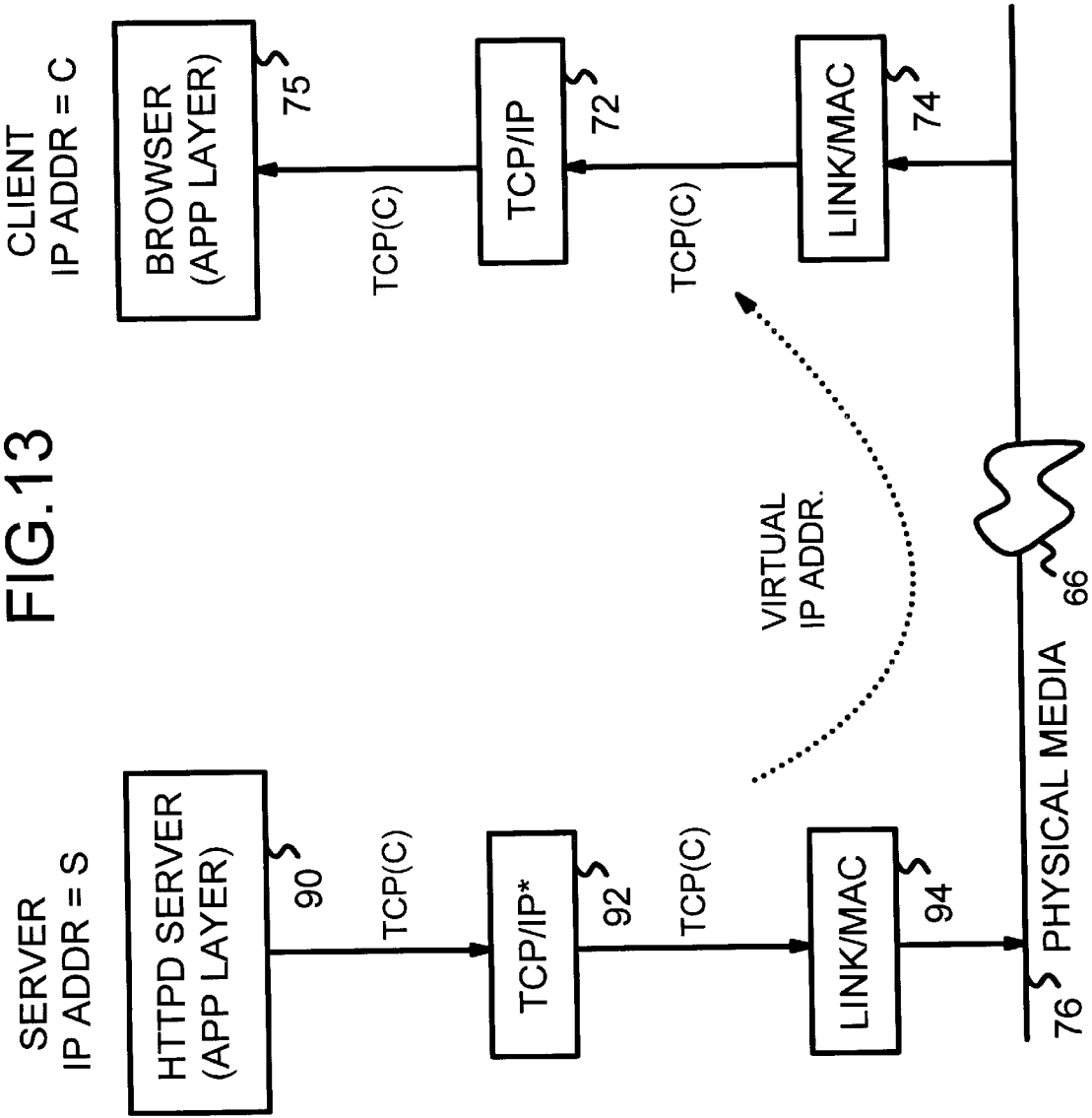
FIG. 13 is a diagram of network layers transmitting packets from the server to the client browser.

Protocol and IP Address Changes—FIGS. 12, 13

FIG. 12 is a diagram of network layers showing a packet sent from the client to the server which is intercepted by the load balancer. A browser running on the application layer 75 of the client sends packets to a web site to establish a connection and to send the URL requesting a file. The browser application sends the data to be sent, the URL addressed to the virtual IP address V of the web site, to TCP/IP stack 72. TCP/IP stack 72 is a stack of the standard TCP and IP layers, which are roughly equivalent to the session, transport, and network layers of the ISO network definition. TCP/IP stack packetizes the URL and adds headers and sends packets to link layer 74, which is the driver for the network-interface controller (NIC). Link layer 74 sends the packets out to Internet 66, perhaps through several routers, hubs, or switches (not shown).

The TCP/IP packets sent from the client have the virtual IP address V of the entire web site as their destination. These packets are shown as "TCP(V)" on the diagram.

The TCP(V) packets are received by the web site and routed to the node having the load balancer since the packets have the virtual IP address. These packets are received by the low-level link layer 84 and sent up to modified TCP/IP stack 82. Modified TCP/IP stack 82 contains the standard TCP and IP modules with some modifications explained later. One modification is that incoming packets from the Internet have their protocol changed from TCP to a proprietary "IXP" protocol. Since this IXP protocol is unknown to the standard TCP and IP layers, it is sent directly up to application layer 80 containing the load balancer.

The load balancer in application layer 80 receives the modified IXP(V) packets with the IXP protocol and the virtual IP address V, and records the packets until the URL is received when it performs load balancing. The packets are then played back to the assigned server to perform TCP state migration as discussed in FIG. 11A. The packets played back are sent from application layer 80 as IXP(S) packets, having the IXP protocol and the assigned server's IP address S. Modified TCP/IP stack 82 uses the server's IP address S to determine the NIC address and the routing information from network routing tables. Once the routing has been determined and the NIC address of the assigned server is found, modified TCP/IP stack 82 changes the protocol back to TCP and the IP address back to the virtual IP address V. The packets sent from modified TCP/IP stack 82 to link layer 84 are TCP(V) packets. Link layer 84 sends these packets out over media 76 with the NIC address that corresponds to the assigned server, but with the virtual IP address as its destination.

The NIC address routes the TCP(V) packets to the assigned server's link layer 94, which passes the packets up to TCP/IP layer 92, perhaps after comparing checksums for error detection. TCP/IP layer 92 is also modified to route SYN, ACK, RST, and FIN packets back to scheduler application layer 80 so the status of the connection can be monitored, as explained later. Normal data transfers to browsers use PUSH packets which are not routed to scheduler application layer 80.

TCP/IP layer 92 recognizes the virtual IP address as a local IP address, so the packets are transferred up to application layer 90 after passing through the IP and TCP layers. Application layer 90 runs the httpd server software which is the standard web-site server software. Thus modified application server software is not needed.

FIG. 13 is a diagram of network layers transmitting data packets from the server to the client browser. The server application in application layer 90 reads the files requested by the URL packets received in FIG. 12, and sends this data to TCP/IP layers 92 addressed to the IP address of the client, which was the source IP address of the incoming packets and was not changed. These packets use the TCP protocol and the client's IP address C, and are designated "TCP(C)". TCP/IP layer 92 uses the virtual IP address as the source address of these outgoing packets rather than the real IP address of the server. Since the incoming packets have the virtual IP address V as the destination IP address, the standard server software simply uses the destination IP address of incoming packets as the source IP address of outgoing packets. Link layer 94 receives these packets and sends them out over the local media 76 and eventually through Internet 66 to the client's link layer 74. These packets are sent up through the client's TCP/IP stack 72 and to the browser in application layer 75 where they are displayed to the user.

Since the client received the virtual IP address as the source IP address in these packets, the client is unaware that the server is a different machine than the load-balancer, or other servers at the web site.

Figure 14:
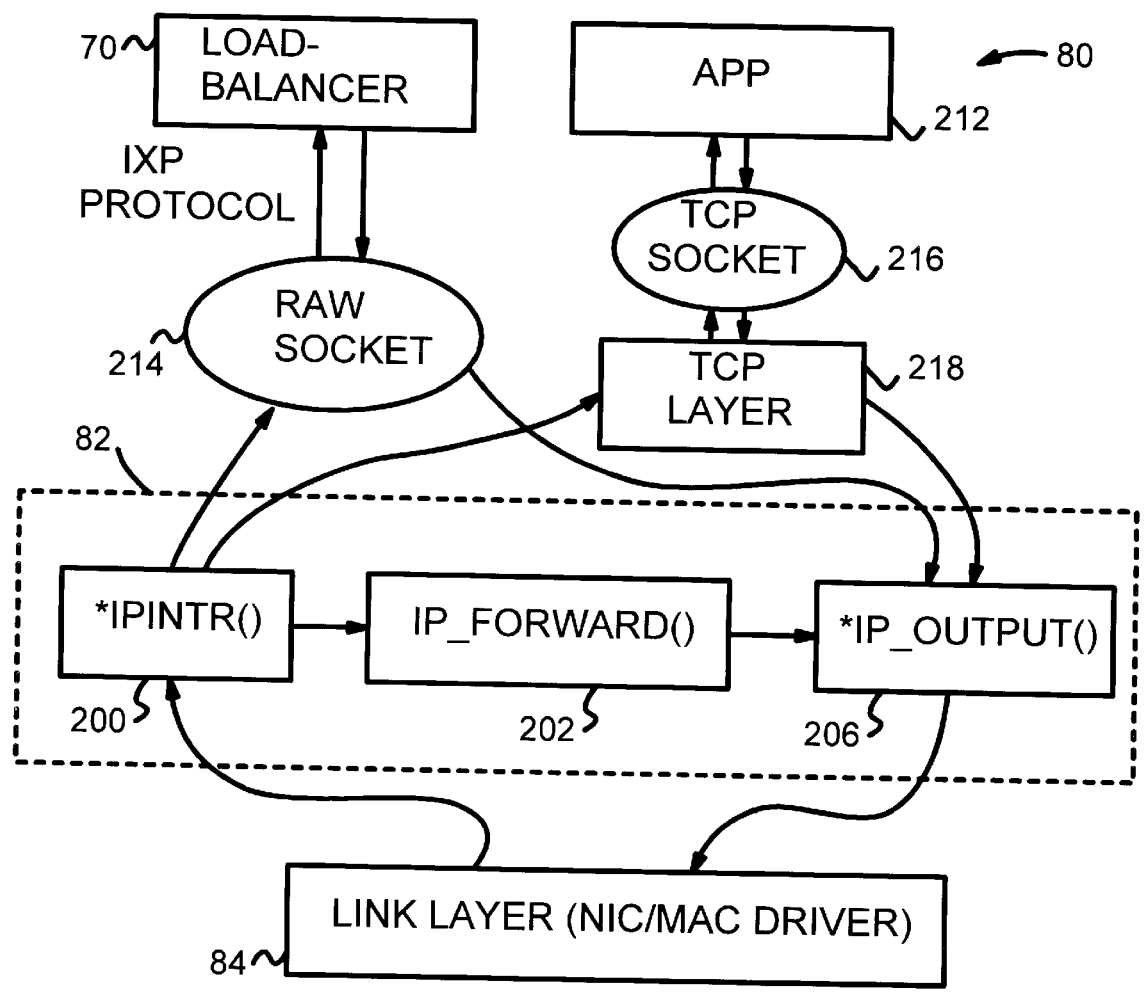
FIG. 14 is a diagram of modifications to the IP layer for the load balancer's node.

Modified IP layer—FIG. 14

FIG. 14 is a diagram of modifications to the IP layer for the load balancer's node.

Unmodified link layer 84 passes packets received up to TCP/IP stack 82, and specifically to IP input module 200 of the IP layer. IP input module 200 determines if the packet is destined for the local node or must be routed or forwarded to another node. Forwarded packets are transferred to IP forward module 202, which prepares the packet for forwarding. Routing tables are consulted by forwarding module 202 to determine where to sent the packet next. Forwarded packets are then sent to IP output module 206, which sends them down to link layer 84.

Local packets are assembled together for IP datagrams, which are passed up to TCP module 218 when the packet's type or protocol is TCP. TCP module 218 transmits the datagram to applications 212 in application layer 80 using TCP socket 216.

Local packets that are not of a known protocol such as TCP or UDP (User Datagram Protocol) have an unrecognized protocol. These datagrams are sent to raw socket 214, bypassing TCP module 218. Any applications in application layer 80 can listen to raw socket 214 and use the datagram, since raw sockets are a standard TCP/IP feature. Load balancer 70 is an application which listens to raw socket 214 for datagrams using the "IXP" protocol. Since the IXP protocol is not a defined protocol, no other applications should be looking for IXP datagrams. Thus using the IXP protocol allows use of raw socket 214 to bypass the TCP layer and send the datagrams directly to load balancer 70.

These datagrams are the connection packets and the URL originally from the client's browser.

Each server is modified to accept packets using the virtual IP address by aliasing a second IP address, thus using two IP addresses. For example, in UNIX, the command:

% ifconfig de0 230.101.17.200 alias netmask 0xffffffff specifies that a second IP address, the virtual IP address 230.101.17.200 is also an IP address for the node. Other operating systems also support IP address aliasing.

Figure 15:
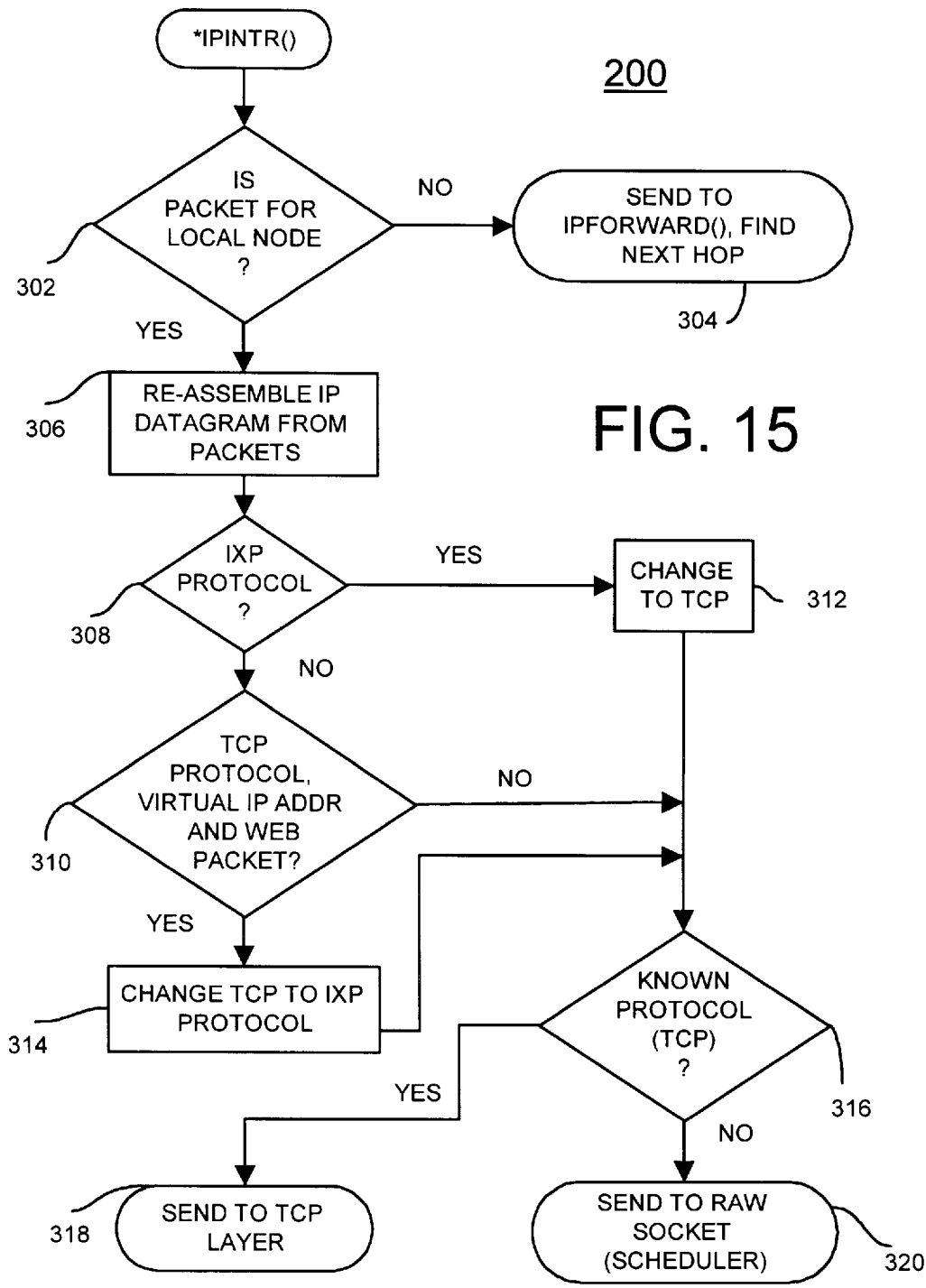
FIG. 15 is a flowchart for a modified IP layer input module.

Modified IP Input Module—FIG. 15

FIG. 15 is a flowchart for a modified IP layer input module. The server with the load balancer uses modified IP input module 200. An asterisk is used to indicate that the module is modified from the generic ip_input() module. Steps 308, 310, 312, and 314 are added steps which are not in the generic IP module.

All packets received from the media by the lower link layer are passed up to the IP layer which calls IP input module 200. Step 302 tests to determine if the packet is for the local node by reading the destination IP address.

When step 302 determines that the destination IP address is not a local IP address, then the packet is being routed through the local node and the IP layer acts as a software router. The packet is passed to IP forward module 202 (step 304) which prepares the packet for forwarding. The packet is then sent to IP output module 206 before being re-transmitted out the link layer to the destination or the next hop.

Step 302 determines that the packet is for the local node when the IP address is the virtual IP address or the real IP address for the server. The packet is stripped of its header information and possibly assembled with other packets to form the IP datagram, step 306.

The assembled IP datagram from step 306 is normally sent up to the TCP layer (steps 316, 318) for the generic IP module. The invention performs additional steps before step 306 by modifying the generic IP input module to form modified IP input module 200. Modified IP input module 200 checks the protocol to determine if it is the IXP protocol. Since incoming packets from the Internet always use the TCP protocol, incoming packets fail step 308 and are then tested by step 310 to determine if they are TCP packets with the virtual IP address and are world-wide-web packets. Thus step 310 looks for incoming packets. These incoming packets have their protocols changed from TCP to IXP, step 314. The IXP protocol is not a recognized protocol, so step 316 causes these incoming packets to be sent to the raw socket, step 320, so that the load balancer application can read these packets. Thus changing the protocol to the unrecognized IXP protocol forces the incoming packets to be sent directly to the load balancer. This allows all incoming packets from the Internet to be routed through the load balancer.

Other TCP packets which are not world-wide web packets fail step 310 and are not modified. These ordinary TCP packets are a known protocol, step 316, and are sent to the TCP layer, step 318.

Step 308, which first checks for the IXP protocol, is used when the local node contains both the load balancer and the assigned server. This step can be deleted if the local node is used exclusively for the load balancer and cannot be an assigned web server.

Figure 16:
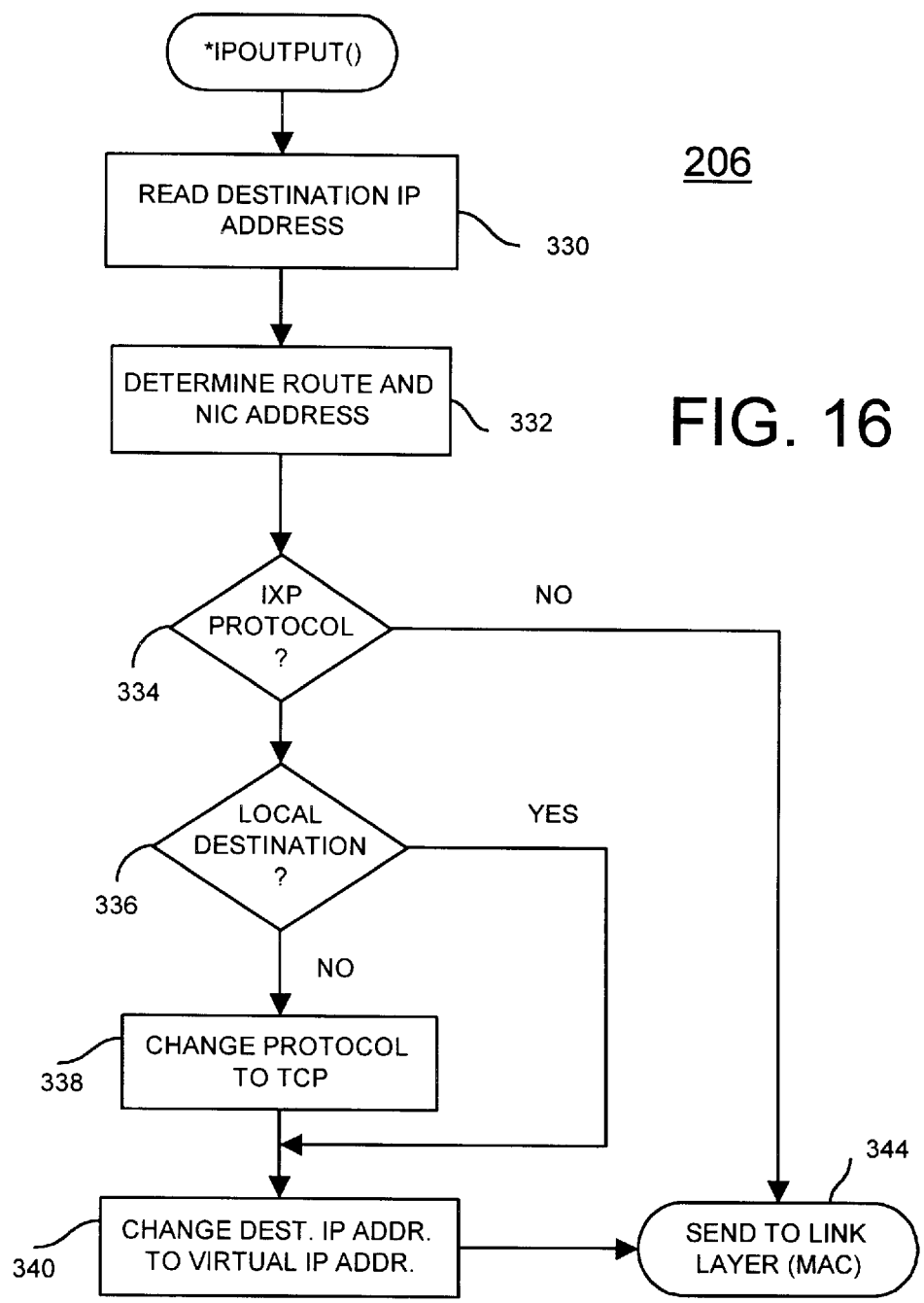
FIG. 16 is a flowchart of an IP layer output module which is modified for transmitting packets from the load balancer.

Modified IP Output Module—FIG. 16

FIG. 16 is a flowchart of an IP layer output module which is modified for transmitting packets from the load balancer. Modified IP output module 206 is a standard IP output module except that steps 334, 336, 338, and 340 have been added.

Ordinary TCP packets which are received from IP forward module 202 or from an application and passed down through the TCP layer have their destination IP address read, step 330, and their route determined by accessing routing tables, step 332. The NIC address of the destination or the next hop to the destination is determined and prefixed to the packet. Ordinary TCP packets fail step 334 and are sent to the link layer, step 344. The link layer then transmits them over the media, unless the NIC address is the local node. These local-destination packets are sent back up through the TCP/IP stack, perhaps to a different application.

Packets which have come from the load balancer application have the unrecognized IXP protocol rather than TCP, and are diverted by step 334 for special processing. When the load balancer assigns the server at the local node, step 336 detects that the destination is the local node, and the packets are passed to step 340, with the IXP protocol intact. These IXP packets are passed back up to modified IP input module 200 and are detected as being for the local server as discussed in the next section.

Packets assigned to another node's server must be sent over the media to the assigned server. Since the assigned servers all use standard TCP/IP stacks, the IXP protocol must be changed back to TCP, step 338. The destination IP address is set to the destination server's real IP address by the load balancer so that the destination's NIC address is generated by step 332 and prefixed to the packet. Since the NIC address has already been determined, the IP address can safely be changed back to the virtual IP address of the entire web site, step 340. The destination servers are all configured to accept packets for the virtual IP address as well as for their real IP address. Thus the real NIC address routes these packets to their destinations, which accepts them.

Modified Network Software for Wide-Area Network Support

When the assigned server resides on the far side of a router or across a wide-area network (WAN), the previous embodiment does not allow packets to get to their final destination. The load balancer normally transmits packets with the physical NIC address of the assigned server, but with the virtual IP address. When the next hop is not the assigned server, such as when the load balancer and the assigned server are separated by a router, the router would route the packet back to the load balancer since the packets have the load balancer's virtual IP address.

Figure 17:
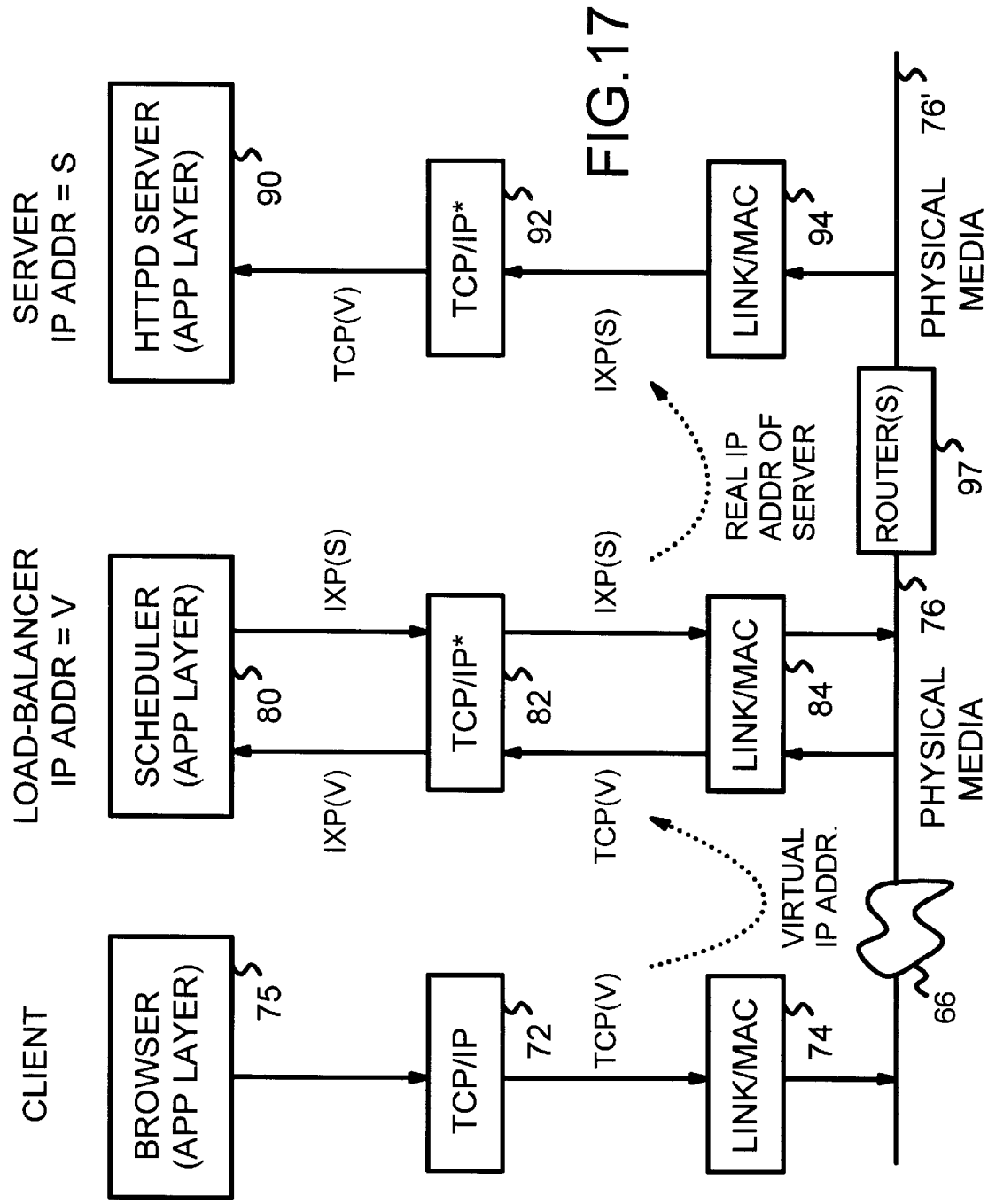
FIG. 17 highlights that the real IP address of the assigned server is used when multiple hops are required.

FIG. 17 highlights that the real IP address of the assigned server is used when multiple hops are required. Multiple-hop data transmissions to the assigned server are supported by further modifying the network software. The destination IP address of the packets from the load balancer to the assigned server are further modified to have the assigned server's real IP address S rather than the virtual IP address V. Thus intermediate routers can use the real IP address S of the assigned server to route the packet to the assigned server.

When packets require multiple hops to reach the assigned server, the physical address of the next hop, intermediate router 97, is determined as before, but the real IP address of the assigned server is retained in the destination IP address field of the IP header. To communicate the virtual address to the assigned server, the virtual IP address is appended to the end of the data in the packet and is sent to the assigned server using the IXP protocol. Packets with the IXP protocol are intercepted and recovered by the assigned server.

A comparison of FIG. 17 to FIG. 12 shows that transmission from load balancer's modified TCP/IP stack 82 to the assigned server's TCP/IP layer 92 uses IXP(S) packets rather than TCP(V) packets. Packets transmitted from the load balancer to the assigned server are transmitted from link layer 84 of the load balancer over physical media 76 to intermediate router 97, then over physical media 76' to link layer 94 of the assigned server. Thus the local network at the server farm can use intermediate routers between the load balancer and the assigned servers. The assigned servers can also be located remotely from the load balancer, such as over a WAN using this technique.

Added Steps When Assigned Server is Local

Incoming packets which are assigned to the load balancer node's server are passed up and down the local TCP/IP stack twice. These packets are first sent from the low-level link layer through the modified IP layer to the load balancer in the application layer, and then back down through the IP layer to the link layer. Step 336 of FIG. 16 detects that the local server is the destination and bypasses steps 338, 340 so that the protocol is left as IXP.

The link layer recognizes that the NIC address is the local NIC address and does not transmit the packets. Instead the packets are sent back up to the IP layer. Step 308 of FIG. 15 detects these packets and changes the protocol back to TCP (step 312) and then passes the TCP packets to the HTTPD server application through the generic TCP layer. This sequence only occurs for a packet that has been intercepted to the load balancer and assigned to the server on the local node.

IP Layer Modified for Servers

The IP layers of the servers are modified in a similar way as the IP layer of the load balancer. All incoming packets are not affected, only special outgoing packets. These special packets are for establishing or closing a connection. These packets need to be intercepted and received by the load balancer during TCP state migration and when the session is closed. The load balancer keeps track of the session with an entry in a session table, and this entry is removed when the session ends.

When the server closes a connection, it sends out a packet with the FIN flag set in the TCP header. When a transmission error occurs, a reset packet may be sent with the RST flag set. Likewise, when the server responds to the load balancer with the SYN/ACK packet during TCP state migration, the SYN and ACK flags are set. Normal data transfers to the browser are PUSH packets and do not have the SYN, ACK, RST, or FIN flags set.

The server's IP output module is modified to detect these special packets by looking at the SYN, ACK, RST, and FIN flags. If none of these TCP flags are set, normal IP processing occurs. However, if any of these special TCP flags are set, then modified IP processing occurs. The protocol is changed from TCP to a variation of IXP called IXCP, and the destination address (the browser's IP address) is stored and replaced with the load balancer's IP address. The IP layer looks up the load balancer's IP address in its routing tables and generates the NIC address for the load balancer's node. The browser's IP address which was stored then replaces the load balancer's IP address, and the packet, with the IXCP protocol, is sent to the load balancer.

The load balancer's IP layer processes these IXCP packets as shown in FIG. 15, the tests of steps 308, 310 fail, so that these IXCP packets are sent up to the load balancer through the raw socket. The load balancer can then alter its session table. FIN and RST packets are changed to TCP and the destination IP address changed to the browser to send out. SYN/ACK are not re-transmitted to the client.

Figure 18:
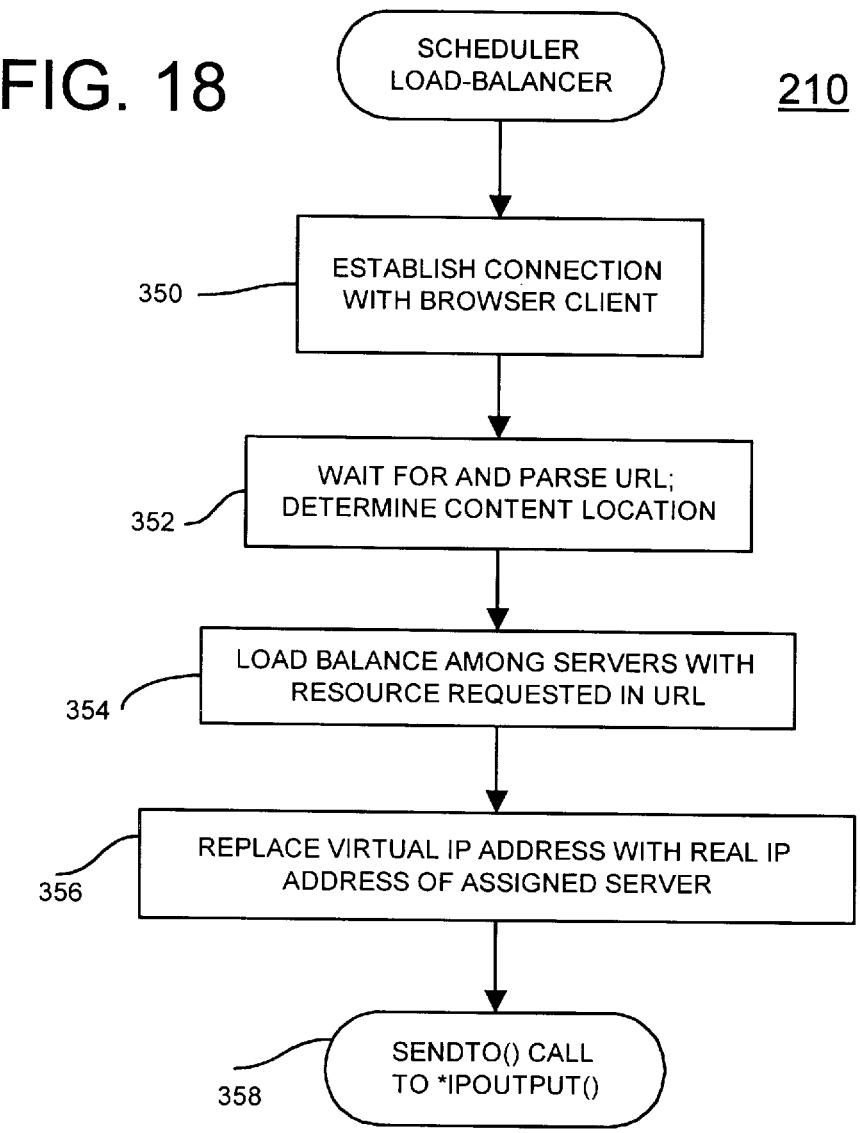
FIG. 18 is a flowchart of the operation of the load balancer.

Load Balancer—FIG. 18

FIG. 18 is a flowchart of the operation of the load balancer. The load balancer is written for the application or user layer so that it can be easily modified. Writing the load balancer for a lower layer such as the IP layer puts the complex load balancing functions in the kernel, and any code modification could require that the system be shut down and rebooted. Having the load balancer in the application layer simplifies node management and allows code modifications to occur with minimal interruption. For performance reasons the inventors anticipate putting the load balancer into the kernel after being sufficiently debugged.

Incoming web packets from the Internet are passed up to load balancer 70 from modified IP input module 200 (FIG. 15). The load balancer is sometimes called a scheduler since it assigns or schedules sessions from browser clients to a server.

The connection is first established with the browser client, step 350, by exchanging packets as was explained in more detail in FIG. 11A. These packets to the browser for establishing the connection are TCP packets with the browser client's IP address; they are not affected by the modifications to the IP output module since the TCP protocol is designated for these connection packets. The incoming and outgoing connection packets are saved and later played back to the assigned server for TCP state migration, as was also shown in FIG. 11A.

Once the connection is established with the client, load balancer 70 waits for the URL and then parses the URL to determine the requested resource. For more complex URL's, such as those containing coordinates of an icon, load balancer 70 needs to decode the URL to determine what resource is being requested. This decoding is normally done by the HTTPD server software. The resource location is thus determined, step 352, and resource-based load balancing can now be performed, step 354. Load balancing occurs among those servers which contain the requested files or resource.

The virtual IP address of the destination for each packet is changed to the real IP address of the assigned server, step 356, before each packet played back to the assigned server is sent to modified IP output module 206. The real IP address is used to determine the real NIC address of the assigned server before the IP address is changed back to the virtual IP address by modified IP output module 206. A sendto() call, step 358, is used to send the packets to modified IP output module 206.

Figure 19:
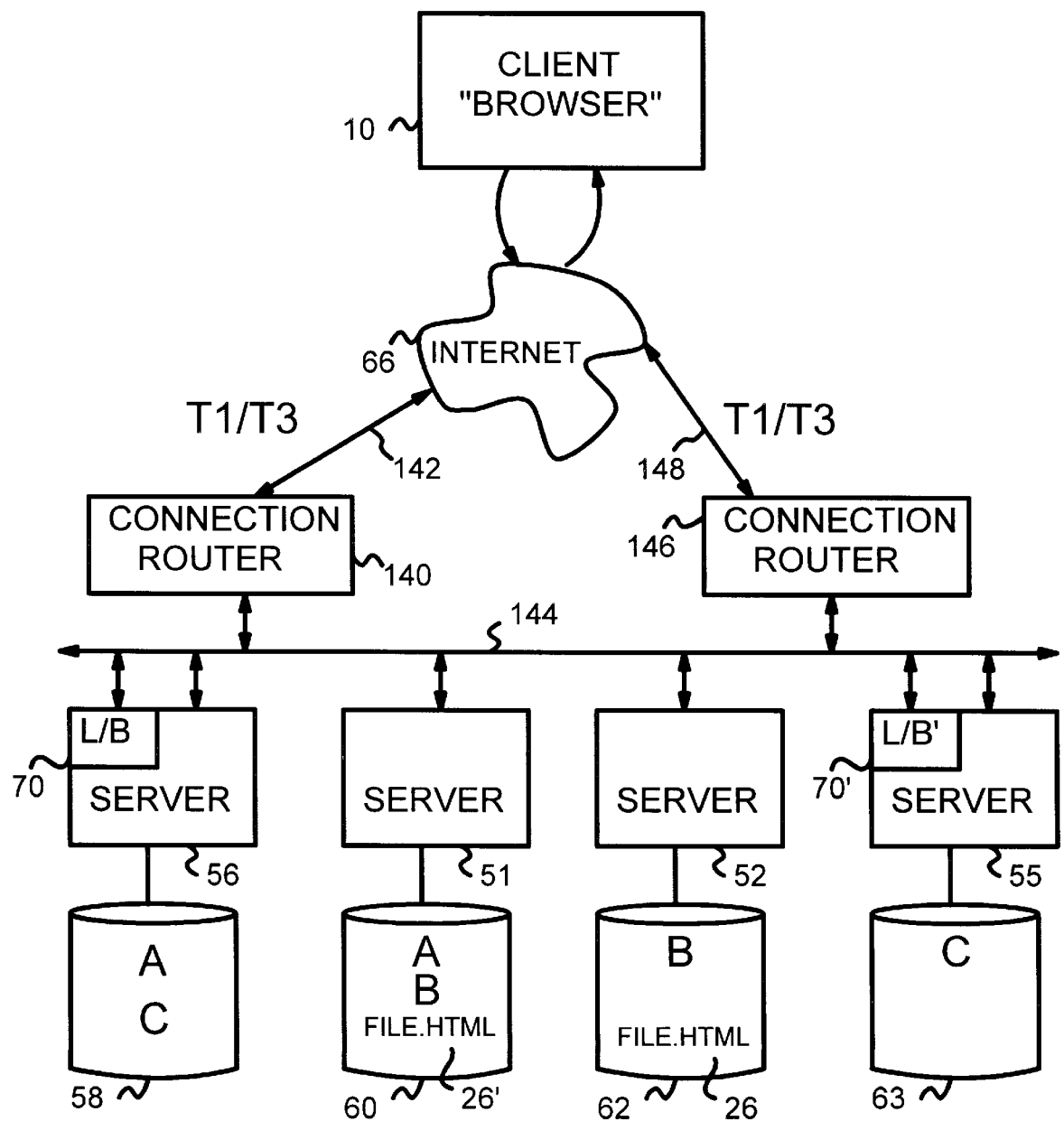
FIG. 19 is a diagram of a fault-tolerant web site with a back-up load balancer and dual Internet connections.

Fault-Tolerant Web Site—FIG. 19

FIG. 19 is a diagram of a fault-tolerant web site with a back-up load balancer and dual Internet connections. Browser 10 sends requests through Internet 66 with a virtual IP address for the whole web site. Incoming packets with the virtual IP address are routed to load balancer 70 over local LAN 144. Local LAN 144 may contain routers, switches, and hubs when servers are located on separate network nodes. Local LAN 144 connects to Internet 66 through Internet connection 142 which directly connects to Internet connection router 140, and through Internet connection 148, which is connected to Internet connection router 146.

Two separate connections 142, 148 are provided to Internet 66 to provide a backup when one connection fails, either due to line problems or failure of a connection router or other hardware or software. Having two connections increases the bandwidth which is needed for larger web sites. Each connection 142, 148 may be a slower T1 telecommunications connection, which supports 1.5 mega bits per second (Mbps), or a more powerful T3 connection which supports 45.5 Mbps. Other Internet connections may be used and mixed freely. Additional Internet connections may be added as demand increases simply by adding another connection router to connect the new connection to local LAN 144.

Since the load balancer is no longer in the router, several connection routers may be used and added or subtracted as needed without affecting load balancing. Standard routers and new technologies can be used. The connection router is not limited to having a certain operating system used by the load balancer. Should a connection router 140, 146 fail, a backup connection router can continue to connect the web servers to Internet 66. There is no single point of failure.

A backup load balancer 70' is also provided to take over operation should primary load balancer 70 fail. These load balancers are located on separate servers to lessen the chance that both fail at the same time. Backup load balancer 70' closely monitors primary load balancer 70 to detect a failure.

The content of the web site is not mirrored to each server's disk. However, to prevent the failure of one server from making some content unavailable, at least one backup copy is made of each file in the web site. For example, file.html 26 exists on disk 62 attached to server 52, and a backup copy of file.html 26' is located on disk 60 of server 51. Load balancer 70 maintains a table or other data structure of all the locations of files in the web site which is used for load balancing. Software utilities may be used to replicate new files or delete all copies of old files. Access statistics of each file or directory of files can be kept to determine which files are more frequently used and should be replicated to more servers, and which files are infrequently used and only two copies should be kept.

Content A is located on disk 58 attached to server 56, which is used for both load balancing and as a server. Content A is also located on disk 60 attached to server 51. Content B is located on disk 60 and disk 62, while content C is located on disk 58 and disk 63 accessed by server 55, which also contains backup load balancer 70'.

A failure of one disk or one server does not crash the entire web site, or even make unavailable some of its content, as all content is backed up on at least one other server. When a failure occurs, system maintenance software makes another backup copy of the lost files so that a second failure does not make some files unavailable.

Even a failure by load balancer 70 does not bring down the web site as backup load balancer 70' is ready to take over load balancing. A failure by the Internet connection router also does not lock out the entire web site as a backup connection and router can be used.

ADVANTAGES OF THE INVENTION

Request-level load-balancer granularity is provided by the web site since a browser sees a failure only when the assigned server fails while processing the URL request. Since the entire web site uses a virtual IP address, client caching of the IP address causes no problems, as all new requests are routed to the load balancer, or the backup load balancer when the primary load balancer fails.

The invention provides a highly fault-tolerant web site. Such a web site greatly reduces the probability that a user gets the "SERVER NOT RESPONDING" error message when a server fails at the web site. Request-level granularity results in fewer browser users being caught when a server crashes; only those users having a current request being served by that server experience an error. Other requests in a session at that web site, and future sessions are not affected.

Servers and routers and even Internet connections can be added or removed without bringing down the web site. Thus a highly maintainable and expandable web site is continuously available to users. The load balancer itself is a user-level software program in the application layer which is more easily modified than lower-level kernel modules.

The standard TCP/IP layers are used except for modifications to the IP layer. This is an advantage since standard software is used as much as possible. The application layer runs the standard httpd server software. Modified server software is not needed. Having the load balancer in the application layer simplifies node management and allows code tweaks to occur with minimal interruption.

ALTERNATE EMBODIMENTS

Several other embodiments are contemplated by the inventors. For example various local networks may be used, including those which use token-ring or other NIC addresses rather than MAC address as the local or physical network address. Switches, hubs, and hardware or software-based routers can be inserted for larger networks.

Each server can process requests from multiple clients, especially when multitasking operating systems such as UNIX and Windows NT are used. While a connection through the public Internet has been described, the connection could also be made through private networks such as corporate networks known as Intranets. Intranets are just a subset of the larger Internet. Thus the web site could be behind a corporate firewall and not be visible to the users of the Internet.

The web site may be a "web-hoster" containing many web sites for different companies rather than a single web site. To support a variety of different sites the load balancer may be modified to accept multiple virtual IP addresses for support of "multi-homed" servers. Heterogeneous clusters could contain different types of servers with each server running different operating systems (OS's) such as UNIX, Windows/ NT, SOLARIS, etc.

The web farm has been described as having a 'local' network, but this local network could be local only in the sense that it is not the Internet backbone. Servers in the web farm may be geographically remote, where some of the servers are located in one city while other servers are located in other cities. Load balancing may be performed not just based on content, but also geographically to minimize traffic on the network backbone. The parts of the web site in a city may be connected locally through one or more LAN's, while being connected to other cities using a WAN. The IXP protocol can be used for all packets sent from the load balancer to the assigned server, even when multiple hops are not required.

The invention has been described as a browser accessing a file on the server, but the file may actually be a resource which is not necessarily a traditional file. The file may be a program, applet, or script which is executed, or an interface into an SQL database or to fast or memory-intensive computational resource. Web servers support application-Programming Interfaces (API's) which enable servers to be compiled with unique capabilities for alternate types of server resources.

Since these resources are expensive to implement on all servers, it is desired to allocate just one or a few servers to handling requests for these resources. The invention waits to perform load-balancing and assign a server until after the URL has been parsed. Thus the invention is ideal for assigning specialty servers having these resources. The web site can be segregated by resource and still be load-balanced.

The invention may also be applied to other Internet traffic as well. The invention could be applied to a File-Transfer-Protocol (FTP) server, a rlogin server, or a telnet server, either as a stand-alone site or as a part of a larger web site.

While delayed resource binding is preferred, other embodiments are contemplated. HTTP redirection from the scheduler to the assigned server may be used after the URL has been parsed. The load balancer sends the client the address of the assigned server and instructs the client to re-issue the URL request using the assigned server's address. Thus redirection is delayed until the URL is parsed and the requested content is determined.

The URL passed to web server can also be modified to reference relocated web pages without changing the links.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A web site for sending resources to a browser on a client connected to a computer network, the web site comprising:

a network connection point for receiving incoming data packets from the computer network and for transmitting outgoing data packets to the computer network;

local network, coupled to the network connection point, for transferring data packets;

a plurality of network nodes containing web servers with resources, the plurality of network nodes connected to the local network, the plurality of network nodes including means for transmitting the resources as outgoing data packets to the client, the plurality of network nodes including means for sending the outgoing data packets over the local network to the network connection point;

wherein the plurality of network nodes containing web servers together contain all resources at the web site, but each network node in the plurality of network nodes contains only a portion of all the resources at the web site;

a balancer network node containing a load balancer, receiving the incoming data packets transmitted over the local network from the network connection point, the load balancer for determining an assigned server in the plurality of network nodes for responding to a request from the client in an incoming data packet, the load balancer including means for transferring a connection to the client to the assigned server;

wherein the balancer network node containing the load balancer is connected to the network connection point by the local network which is also connected to the plurality of network nodes, wherein network nodes are segregated to contain different resources, and wherein all resources at the web site are not mirrored to all network nodes at the web site, wherein the load balancer further comprises:

content means for storing an indication of which network nodes in the plurality of network nodes contain each resource;

URL means, receiving incoming data packets from the client containing a request for a resource, for determining a requested resource from the incoming data packets;

compare means, coupled to the content means and coupled to the URL means, for comparing the requested resource to the indication of which network nodes in the plurality of network nodes contain each resource, and for outputting a list of network nodes containing the requested resource;

balancing means, receiving the list of network nodes containing the requested resource, for choosing as an assigned node one of the network nodes in the list of network nodes, whereby the incoming data packets are routed to the balancer network node but outgoing data packets bypass the balancer network node and whereby the load balancer chooses an assigned node based on the resources contained by each network node, the load balancer performing resource-based load balancing.

2. The web site of claim 1 wherein the balancer network node is in the plurality of network nodes containing web servers.

3. The web site of claim 1 wherein the web site is addressable by one network address for all web servers in the plurality of network nodes containing web servers.

4. The web site of claim 1 further comprising:

delay means, in the load balancer, for delaying assignment of the assigned node until an incoming data packet containing the request for the resource is received, whereby load balancing is delayed.

5. The web site of claim 1 further comprising:

redirect means, in the load balancer, for directing the client to issue a new URL request directly to the assigned node using an address of the assigned node provided by the load balancer to the client;

whereby the client is redirected to the assigned server by the load balancer.

6. A computer-implemented method of servicing requests for resources from a client by nodes containing different resources, the computer-implemented method comprising the steps of:

making a connection and setting up a session between the client and a load balancer at a web site for servicing requests from clients;

waiting for a URL request from the client once the load balancer has made the connection with the client;

receiving the URL request from the client and decoding the URL request to determine a requested resource;

comparing an identifier for the requested resource to identifiers for resources located on a plurality of nodes and determining a first subset of the plurality of nodes which contain the requested resource and a second subset of the plurality of nodes which do not contain the requested resource;

assigning the URL request to an assigned node in the first subset of the nodes which contain the requested resource, by determining the assigned node to be a server in the first subset of the nodes which is least busy processing requests, wherein the assigned node is not in the second subset;

transferring the connection and the session setup to the assigned node containing the requested resource by storing packets received from the client when establishing the connection and by transmitting the packets to the assigned node after the URL request is received;

reading the requested resource on the assigned node and transmitting the requested resource to the client, whereby the assigned node is selected based on a location of the requested resource determined from the URL request and load balancing is performed among nodes having the requested resource and the connection is transferred from the load balancer to the assigned node by re-transmitting the packets to the assigned node.

7. The computer-implemented method of claim 6 wherein the packets received from the client are TCP/IP packets having a destination IP address being a virtual IP address of the load balancer, and wherein the step of transmitting the packets to the assigned node comprises:

changing the virtual IP address of the load balancer in the packets to a real IP address of the assigned node and passing the packets to a modified IP layer;

determining from the real IP address a physical route from the load balancer to the assigned node over a network and generating a physical network address for the assigned node and attaching the physical network address to the packets;

changing the real IP address in the packets back to the virtual IP address before transmission of the packets with the physical network address, whereby the physical network address is generated from the real IP address of the assigned node, but the packets transmitted to the assigned node contain the virtual IP address of the load balancer.

8. The computer-implemented method of claim 6 wherein the packets received from the client are TCP/IP packets having a destination IP address being a virtual IP address of the load balancer, and wherein the step of transmitting the packets to the assigned node comprises:

changing the virtual IP address of the load balancer in the packets to a real IP address of the assigned node and passing the packets to a modified IP layer;

determining from the real IP address a physical route from the load balancer to an intermediate router in a path to the assigned node over a network and generating a physical network address of the intermediate router and attaching the physical network address of the intermediate router to the packets; and transmitting packets having the real IP address of the assigned node as the destination IP address and the virtual IP address of the load balancer appended to data in the packet;

recovering the virtual IP address of the load balancer from the data in the packet when the packet is received by the assigned node, whereby the physical network address of the intermediate router is generated from the real IP address of the assigned node, the load balancer and the assigned node being separated by the intermediate router.

9. The computer-implemented method of claim 7 wherein the load balancer is a program in an application layer above a TCP layer which is above the modified IP layer which is above a link layer, wherein the step of receiving the URL request from the client comprises:

receiving at least one TCP/IP packet from the client and assembling an IP datagram from the at least one TCP/IP packet in the modified IP layer;

changing a protocol for the IP datagram from TCP to an unrecognized protocol;

bypassing the TCP layer and transmitting the IP datagram to the load balancer in the application layer through a raw IP socket, whereby the TCP layer is bypassed for incoming TCP/IP packets of the URL request.

10. The computer-implemented method of claim 9 wherein the step of transferring the connection and the session setup to the assigned node containing the requested resource further comprises:

passing the packets with the virtual IP address up through a modified IP layer and a standard TCP layer to a standard server application in an application layer on the assigned node, the assigned node being configured to accept packets with either the real IP address of the assigned node or the virtual IP address of the load balancer, whereby the assigned node uses the modified IP layer and the standard server application.

11. The computer-implemented method of claim 10 wherein the step of transmitting the requested resource to the client from the assigned node comprises transmitting the requested resource in TCP/IP outgoing packets which contain the virtual IP address of the load balancer as a source IP address but an IP address for the client as the destination IP address, wherein the TCP/IP outgoing packets bypass a node with the load balancer, whereby incoming packets are routed to the load balancer but the outgoing packets bypass the node with the load balancer.

12. The computer-implemented method of claim 11 further comprising the steps of:

creating a session entry for the client in the load balancer when the URL request from the client is received by the load balancer;

updating the session entry for the client to indicate the assigned node when the load balancer assigns the URL request to the assigned node, whereby the load balancer tracks sessions between clients and assigned nodes.

13. The computer-implemented method of claim 12 further comprising the steps of:

reading a FIN flag in the TCP/IP outgoing packets and determining that the TCP/IP outgoing packet is a FIN packet when the FIN flag is set;

changing the IP address of the client to the virtual IP address of the load balancer as the destination IP address for the FIN packet;

transmitting the FIN packet to the load balancer and closing the session entry for the client in the load balancer in response to the FIN packet;

re-transmitting from the load balancer the FIN packet to the client, whereby FIN packets are intercepted by the load balancer.

14. A fault-tolerant server farm for serving resources to browser clients remotely located on a network, the resources containing links to other resources not located at the server farm but located on distant computers on the world-wide web, each link being a universal-resource locator (URL), the URL indicating a host name and a requested resource, the host name indicating a server farm on the network containing the requested resource, the fault-tolerant server farm comprising:

a network connection for transferring packets from the network to a local network;

a plurality of nodes, each node being a computer containing a disk and a connection to the local network;

a plurality of frequently-accessed resources stored on the disk for each node;

a plurality of less-frequently-accessed resources, each of the less-frequently-accessed resources stored on disks for at least two nodes but not stored on the disk for each node;

a primary load balancer, residing on a primary node in the plurality of nodes, for receiving all incoming packets from the network connection, the primary load-balancer assigning URL requests from browser clients to nodes in the plurality of nodes, wherein the primary load balancer comprises:

storage means for storing at least a portion of connection incoming packets for establishing a connection between a browser client and the server farm;

reply means for generating acknowledgment packets to the browser client in response to the connection incoming packets;

URL decoder means, receiving a URL packet once the connection with the browser client is made, for decoding the URL to determine a requested resource requested by the browser client;

assignment means for selecting an assigned node in the plurality of nodes by not selecting nodes which have disks which do not contain the requested resource;

transfer means for transferring the connection to the assigned node by constructing packets using the storage means which stored at least a portion of connection incoming packets;

pass-through means for transferring incoming packets from the browser client to the assigned node once the connection has been transferred to the assigned node, a secondary load balancer, residing on a secondary node in the plurality of nodes, for receiving all incoming packets from the network connection when the primary load balancer fails, the secondary load-balancer assigning URL requests from browser clients to nodes in the plurality of nodes, whereby each node does not contain all resources at the server farm and the primary and secondary load balancers reside on nodes connected to the local network.

15. The fault-tolerant server farm of claim 14 further comprising:

balancing means, coupled to the primary load balancer and to the secondary load balancer, for assigning connection incoming packets to either the primary load balancer or to the secondary load balancer, whereby load balancing is distributed between the primary load balancer and the secondary load balancer.

16. The fault-tolerant server farm of claim 15 wherein the network is the Internet, the fault-tolerant server farm further comprising:

a secondary Internet connection for transferring packets from the Internet to a local network, whereby two Internet connections connect the local network to the Internet.

* * * * *